United States Patent
Nagano et al.

(10) Patent No.: US 8,311,963 B2
(45) Date of Patent: Nov. 13, 2012

(54) SIGNAL PROCESSING APPARATUS, SIGNAL PROCESSING METHOD, SIGNAL PROCESSING PROGRAM AND LEARNING APPARATUS

(75) Inventors: Takahiro Nagano, Kanagawa (JP); Tetsujiro Kondo, Tokyo (JP); Hisakazu Shiraki, Kanagawa (JP); Yasuhiro Suto, Tokyo (JP); Noriaki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1013 days.

(21) Appl. No.: 12/327,980

(22) Filed: Dec. 4, 2008

(65) Prior Publication Data

US 2009/0164398 A1 Jun. 25, 2009

(30) Foreign Application Priority Data

Dec. 21, 2007 (JP) ................................. 2007-330456

(51) Int. Cl.
*G06F 17/00* (2006.01)

(52) U.S. Cl. ......................................... 706/45; 382/254

(58) Field of Classification Search ...................... 706/22
See application file for complete search history.

(56) References Cited

U.S. PATENT DOCUMENTS

| 6,678,405 | B1* | 1/2004 | Kondo et al. | 382/159 |
| 7,149,369 | B2* | 12/2006 | Atkins | 382/299 |
| 7,853,099 | B2* | 12/2010 | Shinmei et al. | 382/305 |
| 2007/0165112 | A1* | 7/2007 | Shinmei et al. | 348/222.1 |
| 2009/0161976 | A1* | 6/2009 | Shiraki et al. | 382/255 |

FOREIGN PATENT DOCUMENTS

| JP | 8-317346 | 11/1996 |
| JP | 2004-40498 | 2/2004 |
| JP | 2004-357062 | 12/2004 |
| JP | 2005-142743 | 6/2005 |

OTHER PUBLICATIONS

U.S. Appl. No. 12/277,591, filed Nov. 25, 2008, Shiraki, et al.
U.S. Appl. No. 12/326,413, filed Dec. 2, 2008, Suto, et al.
Office Action issued May 1, 2012 in Japanese Patent Application No. 2007-330456.

* cited by examiner

*Primary Examiner* — Jeffrey A Gaffin
*Assistant Examiner* — David H Kim
(74) *Attorney, Agent, or Firm* — Oblon, Spivak, McClelland, Maier & Neustadt, L.L.P.

(57) ABSTRACT

A signal processing apparatus for carrying out signal processing to convert input data into output data with a quality higher than the quality of the input data, the data processing apparatus including: a first data extraction section; a nonlinear feature quantity computation section; a processing-coefficient generation section; a second data extraction section; and a data prediction section.

10 Claims, 17 Drawing Sheets

SIGNAL PROCESSING APPARATUS, SIGNAL PROCESSING METHOD, SIGNAL PROCESSING PROGRAM AND LEARNING APPARATUS

CROSS REFERENCES TO RELATED APPLICATIONS

The present invention contains subject matter related to Japanese Patent Application JP 2007-330456 filed in the Japan Patent Office on Dec. 21, 2007, the entire contents of which being incorporated herein by reference.

BACKGROUND OF THE INVENTION

1. Field of the Invention

In general, the present invention relates to a signal processing apparatus, a signal processing method, a signal processing program and a learning apparatus. In particular, the present invention relates to a signal processing apparatus capable of generating output data, which has a quality higher than the quality of input data, from the input data, a signal processing method adopted by the signal processing apparatus, a signal processing program implementing the signal processing method and a learning apparatus.

2. Description of the Related Art

Inventors of the present invention have earlier proposed resolution creation processing for generating an HD (high definition) image, which has a pixel count greater than the pixel count of an SD (standard definition) image, from the SD image. For more information on the proposed resolution creation processing, the reader is suggested to refer to Japanese Patent Laid-open No. Hei 8-317346. In the resolution creation processing, pixels of interest, which are pixels of the HD image to be found from the SD image, are classified into patterns in accordance with the characteristics of SD-image peripheral pixels existing at positions corresponding to the position of the pixel of interest in the HD image and peripheral positions surrounding the position of the pixel of interest. Then, the HD image is generated from the SD image by carrying out a linear process on prediction coefficients stored in advance in a memory by being associated with the patterns and on the SD image. Thus, the resolution creation processing is processing based on the so-called adaptive process adapted to a class (or a pattern cited above) resulting from classification of a pixel of interest and serving as a class to which the pixel of interest pertains.

It is to be noted that the so-called adaptive process adapted to a class resulting from classification of a pixel of interest and serving as a class to which the pixel of interest pertains is used as a base of not only the resolution creation processing, but also deterioration elimination processing for eliminating deteriorations of an image.

SUMMARY OF THE INVENTION

By the way, in the existing adaptive process adapted to a class resulting from classification of a pixel of interest and serving as a class to which the pixel of interest pertains, a prediction coefficient is determined uniquely for each class. Thus, as shown in a diagram of FIG. 1, pixels of interest classified to be pixels of interest pertaining to the same class cannot be distinguished from each other by on the basis of the prediction coefficient determined uniquely for the class as a coefficient peculiar to the class. As a result, the classes become discrete classes, making it difficult to generate the HD image.

In order to solve the problem described above, for example, a class is found by carrying out a 2-bit ADRC (Adaptive Dynamic Range Coding) process or a 3-bit ADRC process which divides the class into sub-classes as shown in a diagram of FIG. 2 as opposed to a 1-bit ADRC process resulting in a single class as shown in the diagram of FIG. 1. That is to say, by carrying out a 2-bit ADRC process or a 3-bit ADRC process, pixels of interest classified to be pixels of interest pertaining to the same class found by carrying out a 1-bit ADRC process can be conceivably distinguished from each other on the basis of the prediction coefficient determined uniquely for the sub-class as a coefficient peculiar to the sub-class obtained as a result of dividing the class.

In this case, however, the number of classes (or, strictly speaking, sub-classes) increases substantially. Thus, the number of samples included in every class as samples used in a learning process of learning prediction coefficients decreases, undesirably reaching a lower limit with ease. As a result, the precision of the prediction coefficients obtained by carrying out the learning process worsened, making it impossible to sufficiently improve the quality of the image.

It is also possible to determine a prediction coefficient of a specific class by carrying out an interpolation process making use of prediction coefficients determined for classes adjacent to the specific class and recognize a pixel of interest classified to be a pixel of interest pertaining to the specific class on the basis of the prediction coefficient determined by carrying out the interpolation process as shown in a diagram of FIG. 3. In this case, however, the prediction coefficients of the adjacent classes different from the specific class, which is the supposed class, are involved in the process of recognizing a pixel of interest. Thus, blurring spots are generated on the resulting HD image. As a result, by carrying out the existing adaptive process adapted to a class resulting from classification of a pixel of interest and serving as a class to which the pixel of interest pertains, it is difficult to generate an HD image, which has a quality higher than the quality of an SD image used as input data, from the SD image.

Addressing the problems described above, inventors of the present invention have innovated a signal processing apparatus capable of generating output data, which has a quality higher than the quality of input data, from the input data.

In accordance with a first embodiment of the present invention, there is provided a signal processing apparatus for carrying out signal processing to convert input data into output data with a quality higher than the quality of the input data. The data processing apparatus employs: a first data extraction section configured to extract a plurality of data included in the input data from the input data as data located at position corresponding to the position of data of interest included in the output data and peripheral positions surrounding the position of the data of interest; a nonlinear feature quantity computation section configured to find a nonlinear feature quantity for the data of interest from the data extracted by the first data extraction section; an processing-coefficient generation section configured to generate a second processing coefficient by carrying out a computation process on the nonlinear feature quantity and a first processing coefficient already learned in advance from student data corresponding to the input data and teacher data corresponding to the output data in a learning process according to a normal equation based on a relation equation for generating the teacher data by carrying out a computation process on the student data and the second processing coefficient obtained in accordance with the nonlinear feature quantity of the student data and the first processing coefficient; the second data extraction section configured to extract a plurality of data included in the input data from the input data as data located at position corresponding to the position of the data of interest and the peripheral positions surrounding the position of the data of interest; and the data prediction section configured to predict the data of interest by carrying out a computation process on the data extracted by the second data extraction section and the second processing coefficient.

In the signal processing apparatus according to the first embodiment of the present invention, the first processing coefficient can have an origin coefficient serving as a reference as well as a deviation coefficient which represents a deviation between the origin coefficient and the second processing coefficient in conjunction with the nonlinear feature quantity.

The signal processing apparatus according to the first embodiment of the present invention is further provided with a class classification section configured to generate a class for the data of interest in accordance with the characteristic of a class tap representing data included in the input data as data located at position corresponding to the position of the data of interest in the output data and peripheral positions surrounding the position of the data of interest. In the signal processing apparatus according to the first embodiment of the present invention, the processing-coefficient generation section generates the second processing coefficient by carrying out a computation process on the nonlinear feature quantity and the first processing coefficient, which is selected from the first processing coefficients each learned in advance for any specific one of the classes in the learning process according to the normal equation provided for the specific class to serve to serve as the first processing coefficient of the class generated by the class classification section.

In addition, in accordance with the first embodiment of the present invention, there is also provided a signal processing method for carrying out signal processing to convert input data into output data with a quality higher than the quality of the input data. The data processing method includes the steps of: first extracting a plurality of data included in the input data from the input data as data located at position corresponding to the position of data of interest included in the output data and peripheral positions surrounding the position of the data of interest; finding a nonlinear feature quantity for the data of interest from the data extracted from the input data; generating a second processing coefficient by carrying out a computation process on the nonlinear feature quantity and a first processing coefficient already learned in advance from student data corresponding to the input data and teacher data corresponding to the output data in a learning process according to a normal equation based on a relation equation for generating the teacher data by carrying out a computation process on the student data and the second processing coefficient obtained in accordance with the nonlinear feature quantity of the student data and the first processing coefficient; second extracting a plurality of data included in the input data from the input data as data located at position corresponding to the position of the data of interest and the peripheral positions surrounding the position of the data of interest; and predicting the data of interest by carrying out a computation process on the data extracted at the second extracting step and the second processing coefficient.

On top of that, in accordance with the first embodiment of the present invention, there is also provided a program implementing a signal processing method for carrying out signal processing to convert input data into output data with a quality higher than the quality of the input data. The program implementing the data processing method is to be executed by a computer to carry out signal processing including the steps of: first extracting a plurality of data included in the input data from the input data as data located at position corresponding to the position of data of interest included in the output data and peripheral positions surrounding the position of the data of interest; finding a nonlinear feature quantity for the data of interest from the data extracted from the input data; generating a second processing coefficient by carrying out a computation process on the nonlinear feature quantity and a first processing coefficient already learned in advance from student data corresponding to the input data and teacher data corresponding to the output data in a learning process according to a normal equation based on a relation equation for generating the teacher data by carrying out a computation process on the student data and the second processing coefficient obtained in accordance with the nonlinear feature quantity of the student data and the first processing coefficient; second extracting a plurality of data included in the input data from the input data as data located at position corresponding to the position of the data of interest and the peripheral positions surrounding the position of the data of interest; and predicting the data of interest by carrying out a computation process on the data extracted at the second extracting step and the second processing coefficient.

In addition, in accordance with a second embodiment of the present invention, there is provided a learning apparatus for carrying out a learning process of learning a first processing coefficient from student data and teacher data. The learning apparatus employs: a normal-equation generation section configured to generate a normal equation, which is an equation constructed by solving a relation equation, by making use of input data as the student data and known output data as the teacher data for the input data; and a coefficient generation section configured to generate the first processing coefficient by solving the normal equation.

The relation equation is an equation used in signal processing for generating output data having a quality higher than the quality of input data by carrying out a computation process on a plurality of data extracted from the input data and on a second processing coefficient which is obtained by carrying out a computation process on a nonlinear feature quantity found in the signal processing from a plurality of data extracted from the input data and on the first processing coefficient generated in advance by the coefficient generation section.

In the learning apparatus according to the second embodiment of the present invention: the first processing coefficient can have an origin coefficient serving as a reference as well as a deviation coefficient which represents a deviation between the origin coefficient and the second processing coefficient in conjunction with the nonlinear feature quantity; and the coefficient generation section 38 generates the origin coefficient and the deviation coefficient by solving the normal equation.

The learning apparatus according to the second embodiment of the present invention is further provided with a class classification section configured to generate a class for each data of interest in accordance with the characteristic of a class tap representing data included in the input data as data located at position corresponding to the position of the data of interest in the output data and the peripheral positions surrounding the position of the data of interest. In the learning apparatus according to the second embodiment of the present invention, the normal-equation generation section is capable of generating the normal equation by making use of the input data and the data of interest for each class generated by the class classification section.

In accordance with the first embodiment of the present invention, signal processing of converting input data into output data having a quality higher than the quality of the input data is carried out by execution of the steps of: first extracting a plurality of data included in the input data from the input data as data located at position corresponding to the position of data of interest included in the output data and peripheral positions surrounding the position of the data of interest; finding a nonlinear feature quantity for the data of interest from the data extracted from the input data; generating a second processing coefficient by carrying out a computation process on the nonlinear feature quantity and a first processing coefficient already learned in advance from student data corresponding to the input data and teacher data corresponding to the output data in a learning process according to a normal equation; second extracting a plurality of data included in the input data from the input data as data located at position corresponding to the position of the data of interest and the peripheral positions surrounding the position of the data of interest; and predicting the data of interest by carrying out a second computation process on the data extracted at this step and the second processing coefficient.

In accordance with the second embodiment of the present invention, a learning process of learning a first processing coefficient from student data and teacher data is carried out by execution of the steps of: generating a normal equation by making use of input data used as the student data and making use of known output data used as the teacher data; and generating the first processing coefficient by solving the normal equation.

The relation equation is an equation used in signal processing for generating output data having a quality higher than the quality of input data by carrying out a computation process on a plurality of data extracted from the input data and on a second processing coefficient which is obtained by carrying out a computation process on a nonlinear feature quantity found in the signal processing from a plurality of data extracted from the input data and on the first processing coefficient generated in advance by the coefficient generation section.

As described above, in accordance with the first embodiment of the present invention, it is possible to generate output data, which has a quality higher than the quality of input data, from the input data in signal processing.

In accordance with the second embodiment of the present invention, in a learning process carried out in advance prior to the signal processing, it is possible to generate processing coefficients for generating output data, which has a quality higher than the quality of input data, from the input data in the signal processing.

BRIEF DESCRIPTION OF THE DRAWINGS

These and other innovations and features of the present invention will become clear from the following description of the preferred embodiments given with reference to the accompanying diagrams in which.

DETAILED DESCRIPTION OF THE PREFERRED EMBODIMENTS

Figure 1:
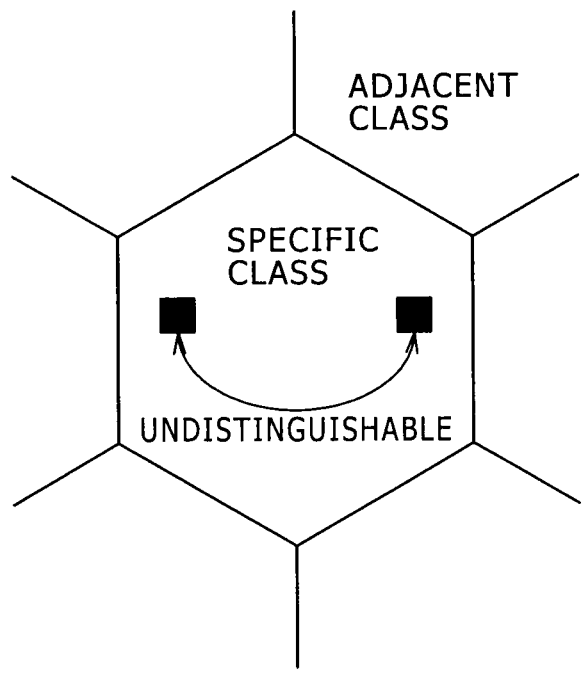
FIG. 1 is an explanatory diagram to be referred to in description of prediction coefficients in an existing class adaptive process.
Figure 2:
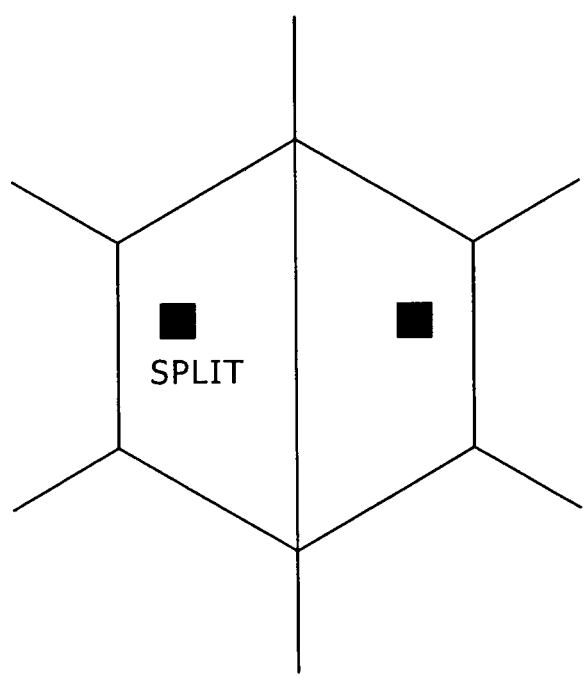
FIG. 2 is an explanatory diagram to be referred to in description of prediction coefficients in another existing class adaptive process.
Figure 3:
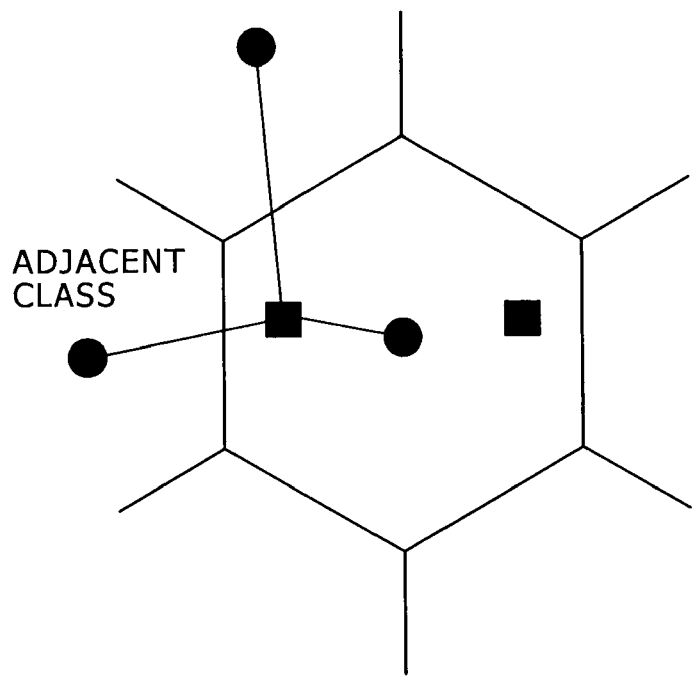
FIG. 3 is an explanatory diagram to be referred to in description of prediction coefficients in a further existing class adaptive process.
Figure 4:
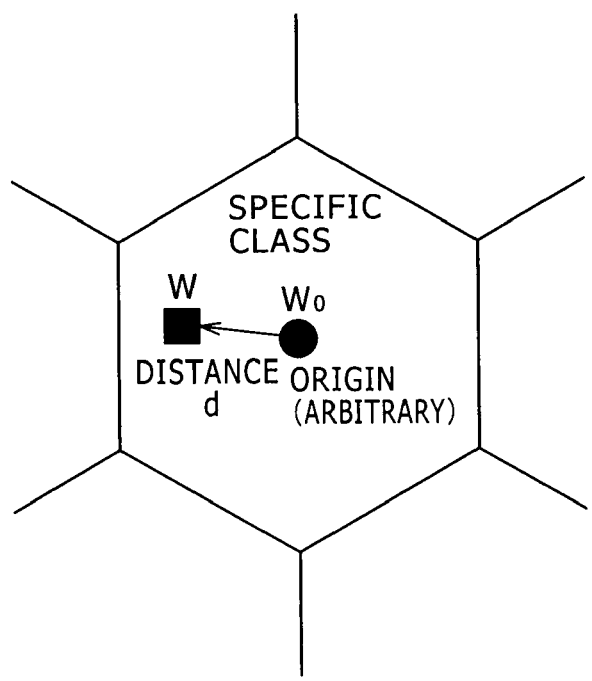
FIG. 4 is a diagram to be referred to in description of the principle of the present invention.

FIG. 4 is a diagram referred to in description of the principle of the present invention.

As shown in the diagram of FIG. 4, in a process provided by an embodiment of the present invention as a class adaptive process, a prediction coefficient W for the data of interest classified to be data of interest pertaining to the same class as other data of interest is found by making use of a continuous function according to a distance vector d in the input data with an origin coefficient $W_0$ taken as a reference. It is to be noted that, representing the prominence of the change of the prediction coefficient W in the input data, the distance vector d in the input data is a nonlinear feature quantity of the input data, and this nonlinear feature quantity is a quantity which cannot be found by linear summation of data of the input data.

To put it concretely, on the basis of the origin coefficient $W_0$, a coefficient space of the prediction coefficient W is expanded into Eq. (1) given below as an equation expressing the prediction coefficient W in terms of the distance vector d.

$$W \cong \sum_{r=0}^{p} \frac{1}{r!} \left( d \cdot \frac{\partial}{\partial d} \right)^r W_0 \quad \text{Eq. (1)}$$

$$= \sum_{r=0}^{p} \frac{1}{r!} \left( d_0 \frac{\partial}{\partial d_0} + d_1 \frac{\partial}{\partial d_1} + \ldots + d_{m-1} \frac{\partial}{\partial d_{m-1}} \right)^r W_0$$

$$= W_0 + \sum_{r=1}^{p} \left\{ \frac{1}{r!} \sum_{i0=0}^{m-1} \sum_{i1=0}^{m-1} \ldots \sum_{i(r-1)=0}^{m-1} d_{i0} d_{i1} \ldots \right.$$

$$\left. d_{i(r-1)} \left( \frac{\partial^r W_0}{\partial d_{i0} \partial d_{i1} \ldots \partial d_{i(r-1)}} \right) \right\}$$

It is to be noted that, in Eq. (1), the prediction coefficient W is handled as an n-dimensional vector (W $(=w_0, w_1, \ldots, w_{n-1})$) including n prediction coefficients. On the other hand, the distance vector d is handled as an m-dimensional vector (d $(=d_0, d_1, \ldots, d_{m-1})$) representing m types of nonlinear feature quantity. Notation p denotes the maximum order of the expansion.

In addition, Eq. (1) is expressed in a format in which the origin coefficient $W_0$ is subjected to a high-order differential expansion operation, and the result of the high-order differential expansion operation is assumed to have a value not varying in accordance with the distance vector d in the class. A new coefficient $W_0, d_{i0}, d_{i1}, \ldots d_{i(r-1)}$ appearing in Eq. (2) given below is defined as product of the result of the high-order differential expansion operation and a constant factor 1/r! Furthermore, duplicated terms are deleted from Eq. (1) in order to clean Eq. (1) and result in Eq. (2) expressed in terms of the new coefficient as follows.

$$W \cong W_0 + \sum_{r=1}^{p} \left\{ \sum_{i0=0}^{m-1} \sum_{i1=0}^{i0} \ldots \sum_{i(r-1)=0}^{i(r-2)} d_{i0} d_{i1} \ldots \right. \quad \text{Eq. (2)}$$

$$\left. d_{i(r-1)} W_{0, d_{i0} d_{i1} \ldots d_{i(r-1)}} \right\}$$

$$= W_0 + \sum_{i0=0}^{m-1} d_{i0} W_{0, d_{i0}} + \sum_{i0=0}^{m-1} \sum_{i1=0}^{i0} d_{i0} d_{i1} W_{0, d_{i0} d_{i1}} + \ldots +$$

$$\sum_{i0=0}^{m-1} \sum_{i1=0}^{i0} \ldots \sum_{i(p-1)=0}^{i(p-2)} d_{i0} d_{i1} \ldots d_{i(p-1)} W_{0, d_{i0} d_{i1} \ldots d_{i(p-1)}}$$

It is to be noted that, in Eq. (2), $W_{0, di0}, W_{0, di0, di1}, \ldots W_{0, di0, di1, \ldots, di(r-1)}$ are coefficients which represent a deviation between the prediction coefficient W and the origin coefficient $W_0$ in conjunction with the distance vector d. In the following description, these coefficients $W_{0, di0}, W_{0, di0, di1}, \ldots W_{0, di0, di1, \ldots, di(r-1)}$ representing a deviation between the prediction coefficient W and the origin coefficient $W_0$ are collectively referred to as a deviation coefficient denoted by notation Wd in the following description for the sake of simplicity.

In Eq. (2), for the order r, the number of terms $S_r$ is expressed by Eq. (3) as follows.

$$s_r = \frac{1}{r!} \prod_{j=0}^{r-1} (m+j) \quad \text{Eq. (3)}$$

Thus, the number S of all variables of the prediction coefficient W is expressed by Eq. (4) as follows.

$$S = \sum_{r=0}^{p} s_r = \left\{ \sum_{r=1}^{p} \frac{1}{r!} \prod_{j=0}^{r-1} (m+j) + 1 \right\} \times n \quad \text{Eq. (4)}$$

It is to be noted that, in Eq. (4), for p=0, S=n is assumed.

As is obvious from the above description, in the class adaptive process according to an embodiment of the present invention, each of prediction coefficients W each used for predicting one of data of interest classified to the same class can be found by making use of the origin coefficient $W_0$, the deviation coefficient Wd and the distance vector d in accordance with Eq. (2). Thus, data of interest classified to the same class can be distinguished from each other on the basis of their prediction coefficients W. As a result, it is possible to generate output data, which has a quality higher than the quality of input data, from the input data.

In addition, in the class adaptive process according to an embodiment of the present invention, in order to distinguish data of interest classified to the same class from each other on the basis of their prediction coefficients W, it is not necessary to divide the class into sub-classes. Thus, the number of classes does not increase. As a result, the precision of a process to learn the prediction coefficient does not deteriorate either. On top of that, in the class adaptive process according to an embodiment of the present invention, the prediction coefficient W is found by taking the origin prediction coefficient $W_0$ of the correct class as a reference. Thus, it is possible to prevent the output data from deteriorating because the prediction coefficients of classes different from the correct class are mixed.

Figure 5:
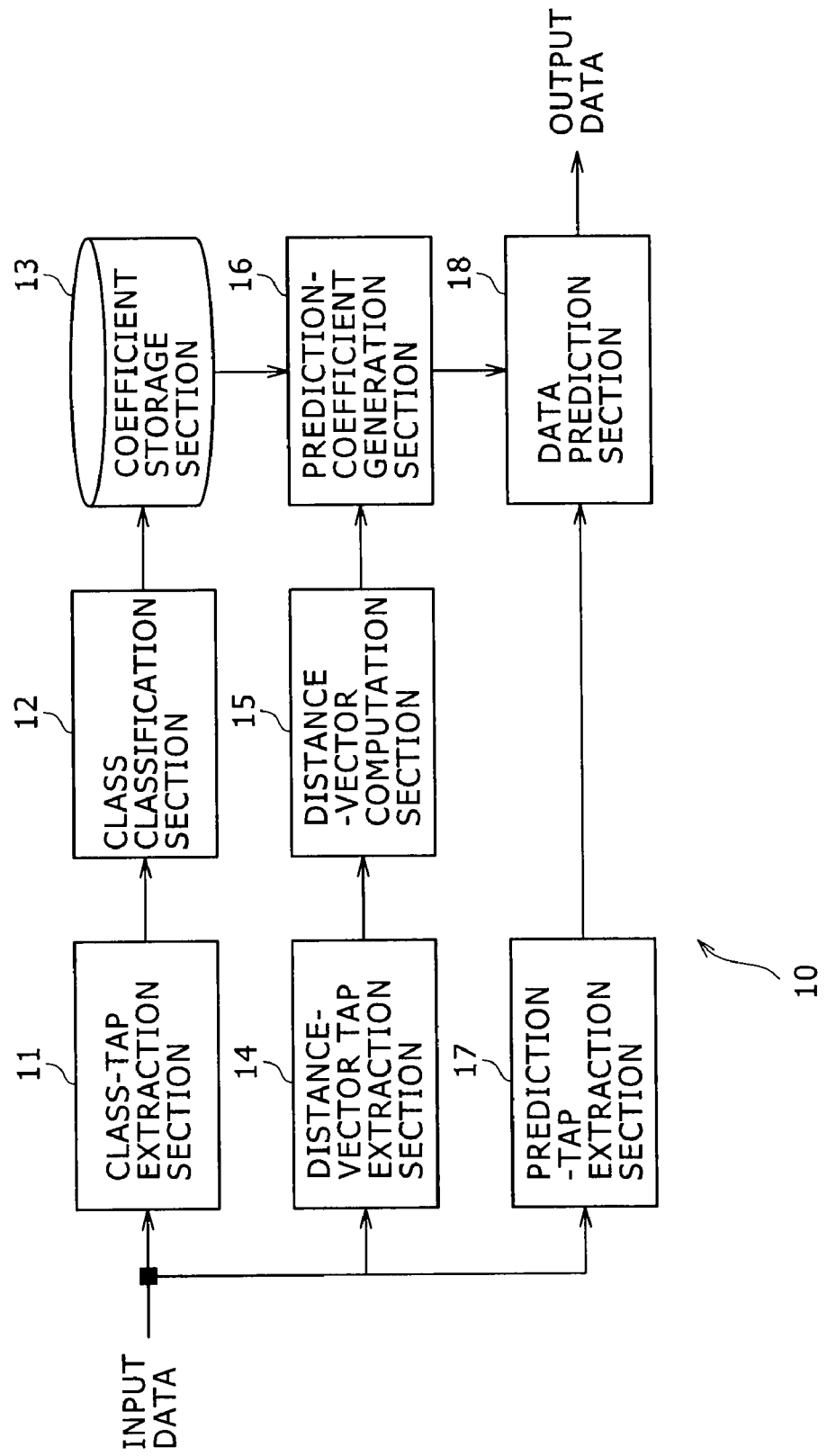
FIG. 5 is a block diagram showing a typical configuration of a signal processing apparatus according to a first embodiment of the present invention.

FIG. 5 is a block diagram showing a typical configuration of the signal processing apparatus 10 according to a first embodiment of the present invention.

As shown in the block diagram of FIG. 5, the typical configuration of the signal processing apparatus 10 includes a class-tap extraction section 11, a class classification section 12, a coefficient storage section 13, a distance-vector tap extraction section 14, a distance-vector computation section 15, a prediction-coefficient generation section 16, a prediction-tap extraction section 17 and a data prediction section 18.

The signal processing apparatus 10 carries out a class adaptive process by generating a class for data of interest in output data to be generated from now on as data, from the input data and then generating the predicted value of each data of interest included in the output data by making use of a prediction coefficient W found by taking the origin coefficient $W_0$ of the class as a reference and making use of the input data. Thus, in the class adaptive process, the input data is converted into output data having a quality higher than the quality of the input data.

To put it in detail, the class-tap extraction section 11 employed in the signal processing apparatus 10 sequentially determines each of a plurality of data to be included in output data, which is to be generated from now on from input data, to serve as data of interest to be predicted as described later. For each data of interest, the class-tap extraction section 11 extracts a plurality of data included in the input data from the input data as a class tap. To be used in a process carried out by the class classification section 12 to classify the data of interest to be data of interest pertaining to a class, the data extracted from the input data as a class tap are data located at positions corresponding to the position of the data of interest in the output data and peripheral positions surrounding the position of the data of interest. Then, the class-tap extraction section 11 supplies the class tap to the class classification section 12.

The class classification section 12 carries out a process of classifying data of interest to be data of interest pertaining to a certain class in accordance with the characteristic of a class tap received from the class-tap extraction section 11. Then, the class classification section 12 generates the class for the data of interest as a result of the process of classifying the data of interest. As a typical method for classifying data of interest to a class, an ADRC (Adaptive Dynamic Range Coding) technique can be adopted. In accordance with the method for classifying data of interest to be data of interest pertaining to a class by adoption of the ADRC technique, data included in the input data as data to be used as a class tap are subjected to an ADRC process and the class of the data of interest is determined in accordance with an ADRC code which is obtained as a result of the ADRC process as follows.

It is to be noted that, in a K-bit ADRC process, a maximum value MAX and a minimum value MIN are detected among a plurality data to be used as a class tap. The difference DR between the maximum value MAX and the minimum value MIN (that is, DR=MAX−MIN) is used as the local dynamic range DR of a set including the data used as a class tap. On the basis of this dynamic range DR, each of the data used as a class tap is re-quantized into K bits. That is to say, the minimum value MIN is subtracted from each of the data used as a class tap, and each of the values obtained as a result of the subtraction operation is divided (or re-quantized) by $DR/2^K$ in order to generate K-bit data. Then, a bit sequence resulting from an operation to arrange the K-bit data, which have been produced by the re-quantization operation as data used as a class tap, in an order determined in advance is used as an ADRC code. Finally, the class classification section 12 determines the class of the data of interest in accordance with the ADRC code.

Thus, in the case of a 1-bit ADRC process carried out on a class tap for example, the minimum value MIN is subtracted from each of data used as the class tap, and each of the values obtained as a result of the subtraction operation is divided (or re-quantized) by DR/2 to generate 1-bit data each have a binary value obtained by truncating the decimal point of the result of the division operation and the fraction part following the decimal point where notation DR denotes the difference between the minimum value MIN and the maximum value MAX. That is to say, each of the data is converted into a 1-bit data in a binary conversion process. Then, a bit sequence resulting from an operation to arrange the 1-bit data in an order determined in advance is used as an ADRC code. Finally, the class classification section 12 determines the class of the data of interest in accordance with the ADRC code and supplies the class to the coefficient storage section 13.

The coefficient storage section 13 is a memory used for storing an origin coefficient $W_0$ and a deviation coefficient Wd for every class. Receiving a class from the class classification section 12, the coefficient storage section 13 provides the prediction-coefficient generation section 16 with an origin coefficient $W_0$ and a deviation coefficient Wd which are associated with the class.

In the same way as the class-tap extraction section 11, the distance-vector tap extraction section 14 sequentially determines each of a plurality of data to be included in the output data to serve as data of interest to be predicted as described later. For each data of interest, the distance-vector tap extraction section 14 extracts a plurality of data included in the input data from the input data as a distance-vector tap. To be used to compute a distance vector d corresponding to the data of interest, the data extracted from the input data as a distance-vector tap are data located at positions corresponding to the position of the data of interest in the output data and peripheral positions surrounding the position of the data of interest. Then, the distance-vector tap extraction section 14 supplies the distance-vector tap to the distance-vector computation section 15.

The distance-vector computation section 15 computes a distance vector d corresponding to the data of interest from the distance-vector tap received from the distance-vector tap extraction section 14 and supplies the distance vector d to the prediction-coefficient generation section 16.

The prediction-coefficient generation section 16 generates a prediction coefficient W by carrying out a computation process according to Eq. (2) based on the origin coefficient $W_0$ and the deviation coefficient Wd, which are received from the coefficient storage section 13, as well as the distance vector d received from the distance-vector computation section 15. The prediction-coefficient generation section 16 supplies the prediction coefficient W to the data prediction section 18.

In the same way as the class-tap extraction section 11 and the distance-vector tap extraction section 14, the prediction-tap extraction section 17 sequentially determines each of a plurality of data to be included in the output data to serve as data of interest. For each data of interest, the prediction-tap extraction section 17 extracts a plurality of data included in the input data from the input data as a prediction tap. To be used to predict the data of interest, the data extracted from the input data as a prediction tap are data located at positions corresponding to the position of the data of interest in the output data and peripheral positions surrounding the position of the data of interest. Then, the prediction-tap extraction section 17 supplies the prediction tap to the data prediction section 18.

The data prediction section 18 carries out a prediction process of predicting data of interest by making use of the prediction coefficient W received from the prediction-coefficient generation section 16 and the prediction tap received from the prediction-tap extraction section 17, generating an predicted value of the data of interest as one of the data of interest to be included in the output data being generated. Then, the data prediction section 18 outputs the output data composed of data each having an predicted value produced by the prediction process.

Figure 6:
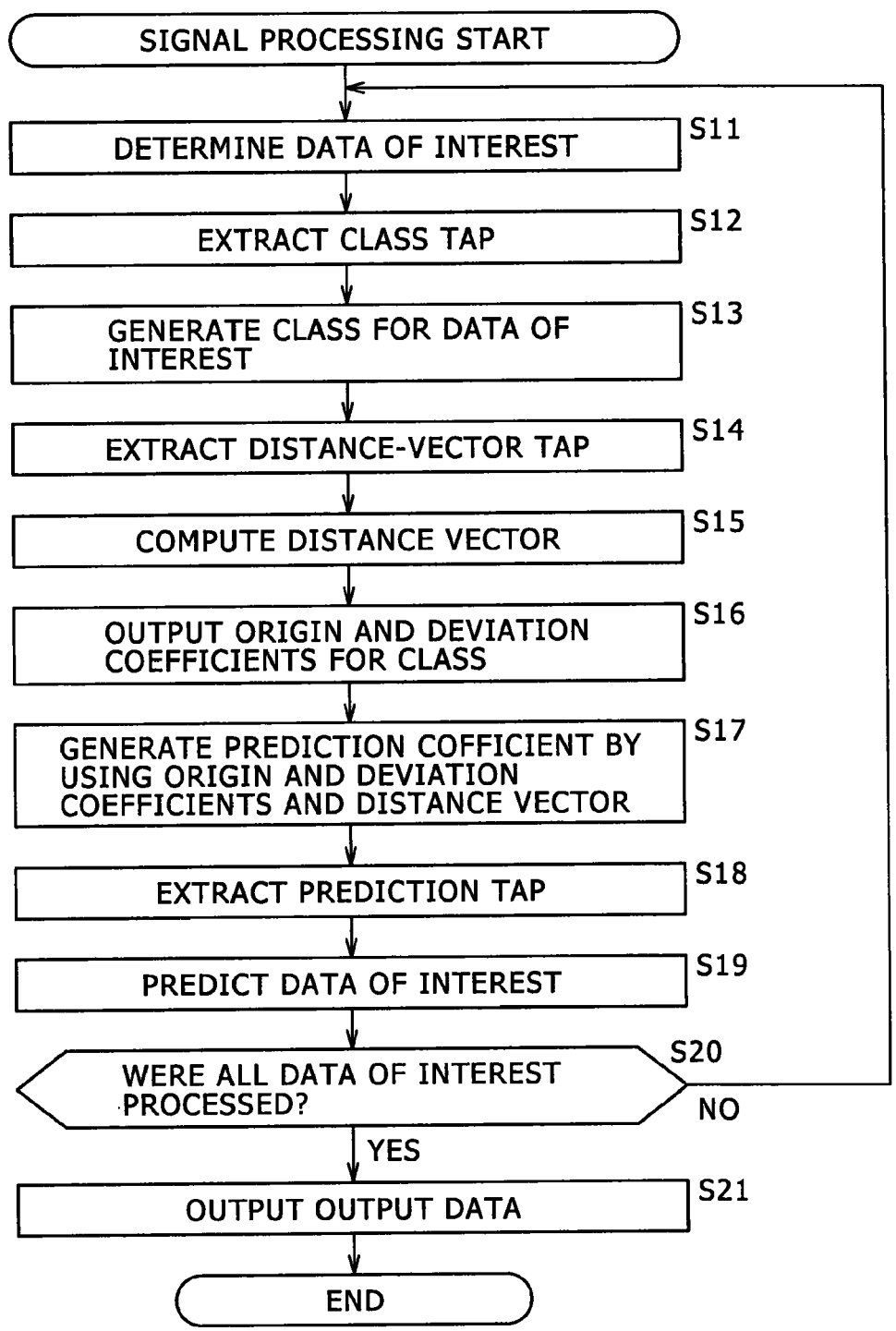
FIG. 6 shows a flowchart to be referred to in explanation of signal processing carried out by the signal processing apparatus shown in the block diagram of FIG. 5.

By referring to a flowchart shown in FIG. 6, the following description explains the signal processing carried out by the signal processing apparatus 10 shown in the block diagram of FIG. 5.

The flowchart begins with a step S11 at which each of the class-tap extraction section 11, the distance-vector tap extraction section 14 and the prediction-tap extraction section 17 selects data, which has not been determined yet so far as data of interest, from a plurality of data to be included in output data being generated, and determines the selected one as data of interest. Then, at the next step S12, the class-tap extraction section 11 extracts a class tap corresponding to the data of interest from the input data and supplies the class tap to the class classification section 12.

Subsequently, at the next step S13, in accordance with the characteristic of the class tap received from the class-tap extraction section 11, the class classification section 12 classifies the data of interest to a class and generates the class for the data of interest. Then, the class classification section 12 provides the coefficient storage section 13 with the class to which the data of interest pertains.

Subsequently, at the next step S14, the distance-vector tap extraction section 14 extracts a distance-vector tap corresponding to the data of interest from the input data and supplies the distance-vector tap to the distance-vector computation section 15. Then, at the next step S15, the distance-vector computation section 15 computes a distance vector d from the distance-vector tap received from the distance-vector tap extraction section 14 and supplies the distance vector d to the prediction-coefficient generation section 16.

Subsequently, at the next step S16, the coefficient storage section 13 supplies the prediction-coefficient generation section 16 with an origin coefficient $W_0$ and a deviation coefficient Wd which correspond to the class received from the class classification section 12.

Then, at the next step S17, the prediction-coefficient generation section 16 generates a prediction coefficient W by carrying out a computation process according to Eq. (2) based on the origin coefficient $W_0$ and the deviation coefficient Wd, which are received from the coefficient storage section 13, as well as the distance vector d received from the distance-vector computation section 15. Subsequently, the prediction-coefficient generation section 16 supplies the prediction coefficient W to the data prediction section 18.

Then, at the next step S18, the prediction-tap extraction section 17 extracts a prediction tap corresponding to the data of interest from the input data and supplies the prediction tap to the data prediction section 18.

Subsequently, at the next step S19, the data prediction section 18 carries out a prediction process of predicting data of interest by making use of the prediction coefficient W received from the prediction-coefficient generation section 16 and the prediction tap received from the prediction-tap extraction section 17, generating an predicted value of the data of interest as one of the data of interest to be included in the output data. Then, at the next step S20, each of the class-tap extraction section 11, the distance-vector tap extraction section 14 and the prediction-tap extraction section 17 produces a result of determination as to whether or not each of data to be included in the output data being generated has been determined as data of interest.

If the determination results produced at the step S20 indicate that any one of data to be included in the output data has not been determined as data of interest, the flow of the signal processing goes back to the step S11 to repeat the signal processing described above.

If the determination results produced at the step S20 indicate that each of data to be included in the output data has been determined as data of interest, on the other hand, the flow of the signal processing goes on to a step S21 at which the data prediction section 18 outputs the output data composed of the data of interest each generated by carrying out the prediction process at the step S19. Finally, the signal processing is ended.

As described above, the signal processing apparatus 10 generates a prediction coefficient W by making use of an origin coefficient $W_0$ and a deviation coefficient Wd, which are associated with a class determined to be a class including the data of interest. Thus, data of interest classified to be pertaining to the same class can be distinguished from each other on the basis of their prediction coefficients W.

It is to be noted that the origin coefficient $W_0$ and the deviation coefficient Wd are typically learned in advance from student data corresponding to input data and teacher data corresponding to known output data for the input data in a learning process which adopts a least-square method as described below.

As a predetermined prediction process, a linear prediction process is adopted as a process of predicting data of interest. In this case, data of interest y of the output data are found in accordance with a linear equation given as follows:

$$y = WX \qquad \text{Eq. (5)}$$

In this patent specification, Eq. (5) is also referred to as the relation equation cited before. In Eq. (5) given above, notation X denotes an n-dimensional vector ($X=(x_0, x_1, \ldots x_n)$) including n data included in the input data as a prediction tap for the data of interest y of the output data being generated. Thus, the number of input data included in the prediction tap is equal to the number of prediction coefficients composing the prediction coefficient W.

It is to be noted that, instead of making use of the linear equation of Eq. (5) as an equation for finding data of interest y to be included in the output data, a quadratic equation of an even higher order equation can also be used.

Let notation $y_k$ denote the true value of a kth sample (or a kth data of interest) of the output data which is the teacher data in this case whereas notation $X_k (X_k=(x_{k0}, x_{k1}, \ldots x_{kn})$) denote an n-dimensional vector expressing a prediction tap representing n data included in the input data, which is the student data in this case, as data located at positions corresponding to the position of the kth data of interest in the output data and peripheral positions surrounding the position of the kth sample. Also let the least square method be adopted as a typical standard for determining that the value of the prediction coefficient W used for finding an predicted value y of an output data in accordance with Eq. (5) is optimal. Since the prediction coefficient W is found from an origin coefficient $W_0$ and a deviation coefficient Wd, the least square method must provide optimal values of the origin coefficient $W_0$ and the deviation coefficient Wd as will be described below. In the case of the least square method, a typical evaluation function Q is expressed by Eq. (6) given as follows.

$$\begin{aligned}
Q &= \sum_{k=1}^{N} t_k \cdot \{y_k - W \cdot X_k^T\}^2 \\
&= \sum_{k=1}^{N} t_k \cdot \left\{ y_k - \left[ W_0 + \sum_{r=1}^{p} \left\{ \sum_{i0=0}^{m-1} \sum_{i1=0}^{i0} \cdots \right. \right. \right. \\
&\qquad \left. \left. \left. \sum_{i(r-1)=0}^{i(r-2)} d_{i0} d_{i1} \cdots d_{i(r-1)} W_{0, d_{i0}, d_{i1} \cdots d_{i(r-1)}} \right\} \right] \cdot X_k^T \right\}^2
\end{aligned} \qquad \text{Eq. (6)}$$

It is to be noted that, in Eq. (6) given above, notation N denotes the number of data of interest $y_k$ each used in a set learning process as a sample (or a learning sample). In this case, the technical term "set learning process" is deliberately used in order to indicate that the word "set" in the technical term "set learning process" including data of interest $y_k$ of the teacher data used as output data and an n-dimensional vector $X_k$ expressing a prediction tap representing n data included in the input data, which is the student data, as data located at positions corresponding to the data of interest $y_k$ in the output data and peripheral positions surrounding the position of the data of interest $y_k$. Notation $t_k$ denotes a weight assigned to the kth sample (or the data of interest $y_k$). Typically, the weight $t_k$ is a constant determined in accordance with the magnitude of a distance vector d.

The evaluation function Q is expressed by an expression on the right-hand side of Eq. (6) as a function dependent on the weight $t_k$, the true value $y_k$ of the teacher data for the data of interest, the origin coefficient $W_0$, the distance vector d, the deviation coefficient Wd and the n-dimensional vector $X_k$. On the basis of the least square method, the minimum (or the minimal value) of the evaluation function Q expressed by Eq. (6) is given by an origin coefficient $W_0$ and a deviation coefficient Wd which are found by setting each of partial differentials, which are derived with respect to the origin coefficient $W_0$ and the deviation coefficient Wd as partial differentials of the evaluation equation Q, at 0. That is to say, first of all, the evaluation function Q expressed by Eq. (6) is partially differentiated with respect to the origin coefficient $W_0$ and the deviation coefficient Wd and, then, each of the partial differentials obtained as a result of the partial differential operations is set at 0 to yield simultaneous equations shown in a diagram of FIG. 7 as a determinant which is referred to hereafter simply as a determinant. Then, in the so-called learning process, the simultaneous equations are solved to find the origin coefficient $W_0$ and the deviation coefficient Wd.

Figure 7:
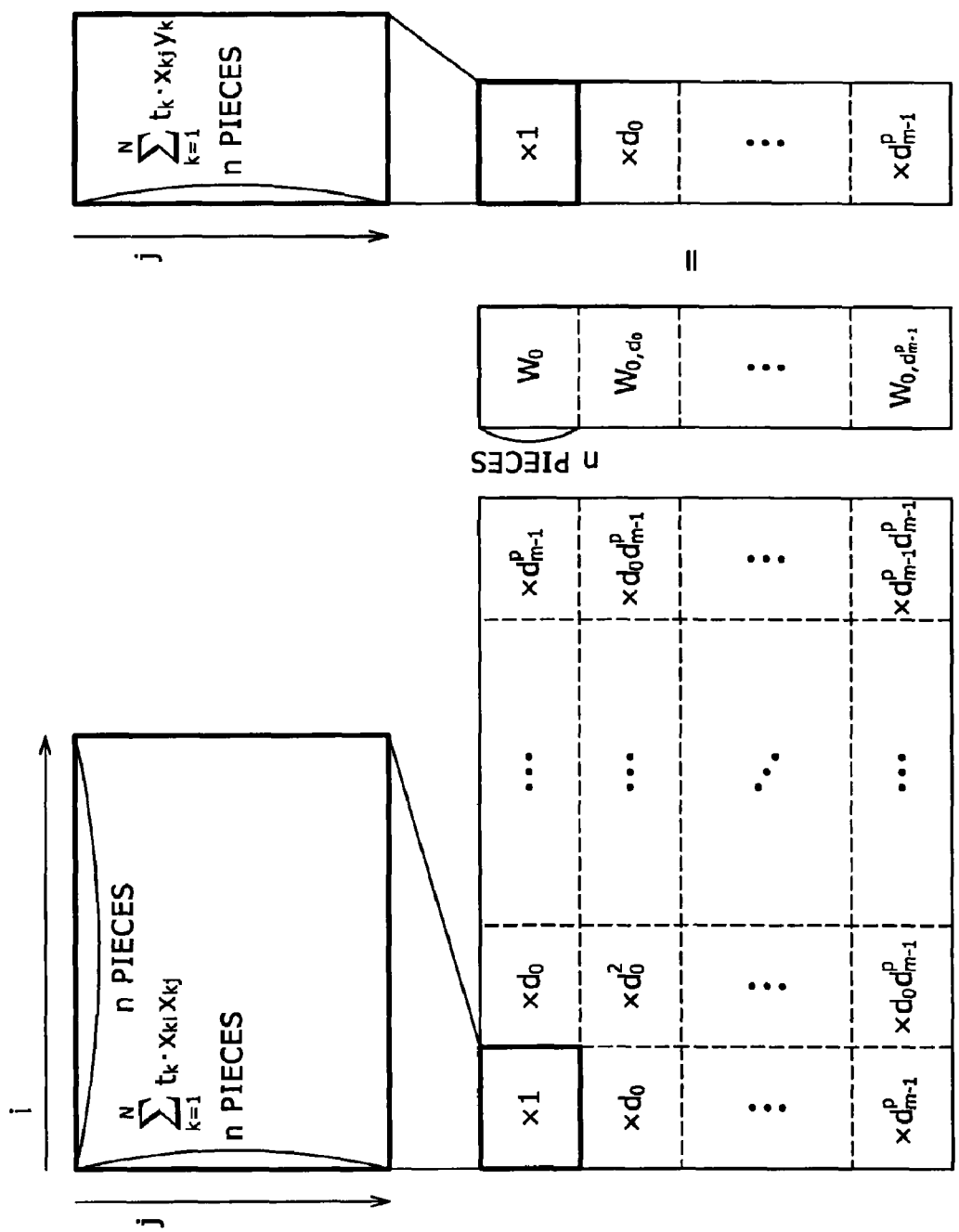
FIG. 7 is a diagram showing a determinant used in a learning process for learning an origin coefficient and a deviation coefficient from student data and teacher data.

Each of matrixes of the determinant shown in the diagram of FIG. 7 is divided into small blocks. To be more specific, the leftmost matrix on the left-hand side of the determinant is divided into small blocks which are each an n-row×n-column matrix shown at the left upper corner of the diagram of FIG. 7. Each of the middle matrix on the left-hand side of the determinant and the rightmost matrix on the right-hand side of the determinant is divided into small blocks which are each an n-row×1-column matrix shown at the right upper corner of the diagram of FIG. 7. Each small block of the leftmost matrix on the left-hand side of the determinant and each small block of the rightmost matrix on the right-hand side of the determinant is obtained by multiplying the corresponding elements of a matrix corresponding to a linear prediction process in the existing class adaptive process by the value of a distance vector d according to the position of the small block. It is to be noted that notations i and j (both satisfying the relation $0 \leq i, j \leq n$) shown in the diagram of FIG. 7 denote respectively the column and row positions of data in a prediction tap.

It is to be noted that this determinant is generated for every class to find an optimal origin coefficient $W_0$ and an optimal deviation coefficient Wd for the class.

In the class adaptive process carried out by the signal processing apparatus 10, the optimal origin coefficient $W_0$ and the optimal deviation coefficient Wd, which are found in the learning process according to the normal equation shown in the diagram of FIG. 7 as described above, are used by the prediction-coefficient generation section 16 to compute a prediction coefficient W in a computation process according to Eq. (2). Then, the prediction coefficient W is used by the data prediction section 18 in a prediction process making use of the prediction coefficient W in accordance to Eq. (5) also referred to as a relation equation in order to convert the input data into the output data.

Figure 8:
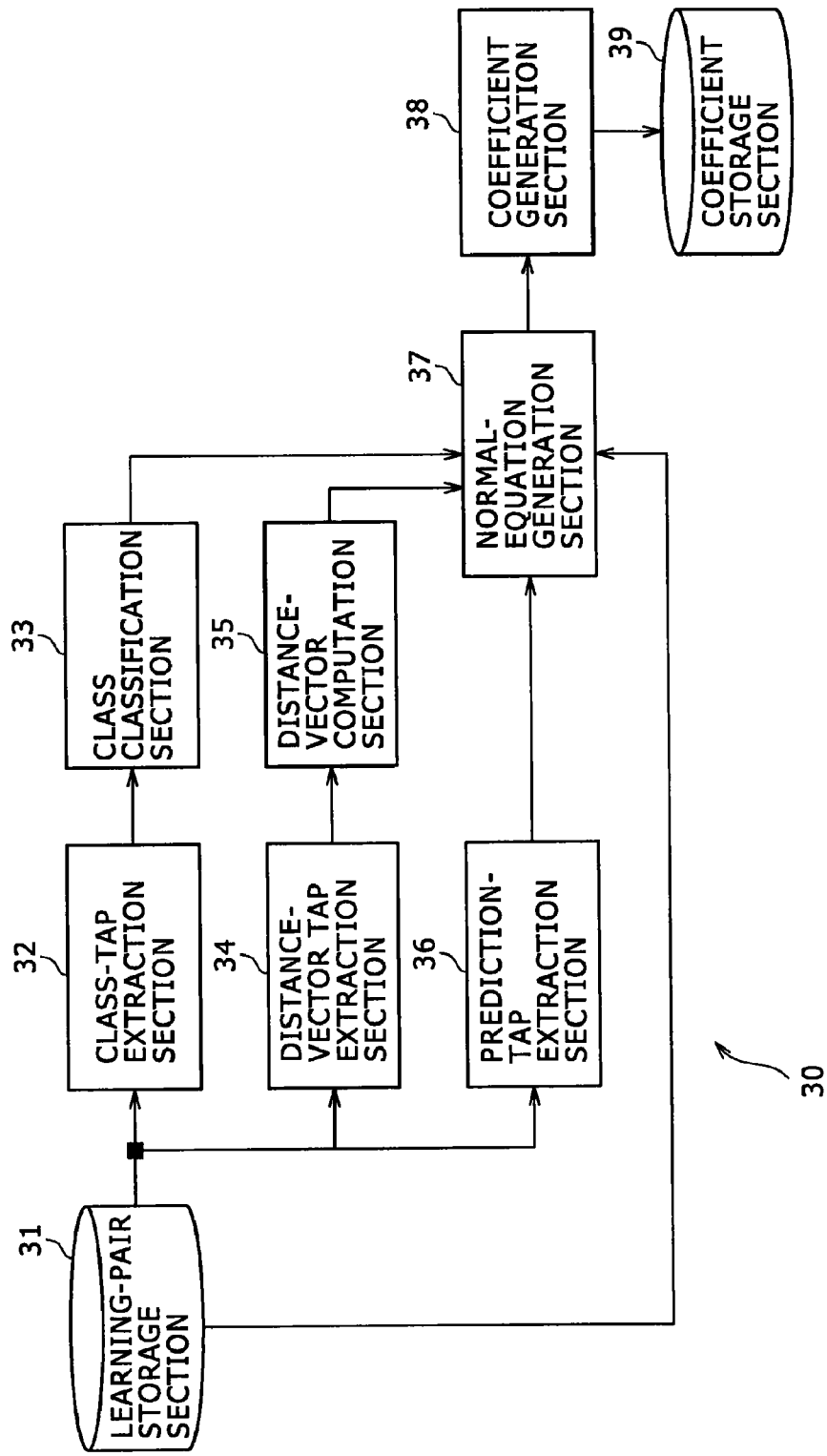
FIG. 8 is a block diagram showing a typical configuration of a learning apparatus for learning an origin coefficient and a deviation coefficient which are used by the signal processing apparatus shown in the block diagram of FIG. 5 to compute a prediction coefficient.

FIG. 8 is a block diagram showing a typical configuration of a learning apparatus 30 for carrying out a learning process of learning an origin coefficient $W_0$ and a deviation coefficient Wd, which are used by the signal processing apparatus 10 shown in the block diagram of FIG. 5.

As shown in the block diagram of FIG. 8, the learning apparatus 30 employs a learning-pair storage section 31, a class-tap extraction section 32, a class classification section 33, a distance-vector tap extraction section 34, a distance-vector computation section 35, a prediction-tap extraction section 36, a normal-equation generation section 37, a coefficient generation section 38 and a coefficient storage section 39.

The learning-pair storage section 31 employed in the learning apparatus 30 is a memory used for storing learning pair data including student data and teacher data which form a learning pair. The student data of the learning pair is one of data used in a process of learning an origin coefficient $W_0$ and a deviation coefficient Wd. The student data corresponds to the input data in the signal processing apparatus 10. The other data of the learning pair used in the process of learning is teacher data. The teacher data is data corresponding to ideal output data known for the student data.

The learning-pair storage section 31 outputs the student data of a learning pair to the class-tap extraction section 32, the distance-vector tap extraction section 34 and the prediction-tap extraction section 36, but outputs the teacher data to the normal-equation generation section 37.

In the same way as the class-tap extraction section 11 employed in the signal processing apparatus 10 shown in the diagram of FIG. 5, the class-tap extraction section 32 sequentially determines each of a plurality of data included in the teacher data, to serve as data of interest. For each data of interest, the class-tap extraction section 32 extracts a plurality of data included in the student data from the student data as a class tap. To be used to classify the data of interest to be data of interest, the data extracted from the student data as a class tap are data located at positions corresponding to the position of the data of interest in the teacher data and peripheral positions surrounding the position of the data of interest. Then, the class-tap extraction section 32 supplies the class tap to the class classification section 33.

In the same way as the class classification section 12 employed in the signal processing apparatus 10 shown in the diagram of FIG. 5, the class classification section 33 carries out a process of classifying data of interest to a certain class in accordance with the characteristic of a class tap received from the class-tap extraction section 32 as a class tap extracted by the class-tap extraction section 32 for the data of interest. Then, the class classification section 33 generates the class for the data of interest as a result of the process of classifying the data of interest. The class classification section 33 supplies the class to the normal-equation generation section 37.

In the same way as the distance-vector tap extraction section 14 employed in the signal processing apparatus 10 shown in the diagram of FIG. 5 and the class-tap extraction section 32 described above, the distance-vector tap extraction section 34 sequentially determines each of a plurality of data included in the teacher data as data of interest. For each data of interest, the distance-vector tap extraction section 34 extracts a plurality of data included in the student data from the student data as a distance-vector tap. To be used to compute a distance vector d corresponding to the data of interest, the data extracted from the student data as a distance-vector tap are data located at positions corresponding to the position of the data of interest in the teacher data and peripheral positions surrounding the position of the data of interest. Then, the distance-vector tap extraction section 34 supplies the distance-vector tap to the distance-vector computation section 35.

In the same way as the distance-vector computation section 15 employed in the signal processing apparatus 10 shown in the diagram of FIG. 5, the distance-vector computation section 35 computes a distance vector d corresponding to the data of interest from the distance-vector tap received from the distance-vector tap extraction section 34 and supplies the distance vector d to the normal-equation generation section 37.

In the same way as the prediction-tap extraction section 17 employed in the signal processing apparatus 10 shown in the diagram of FIG. 5 as well as the class-tap extraction section 32 and the distance-vector tap extraction section 34, which have been described above, the prediction-tap extraction section 36 sequentially determines each of a plurality of data included in the teacher data as data of interest. For each data of interest, the prediction-tap extraction section 36 extracts a plurality of data included in the student data from the student data as a prediction tap to be used for finding the normal equation for the data of interest. The data extracted from the student data as a prediction tap are data located at positions corresponding to the position of the data of interest in the teacher data and peripheral positions surrounding the position of the data of interest. Then, the prediction-tap extraction section 36 supplies the prediction tap to the normal-equation generation section 37.

For every class received from the class classification section 33, the normal-equation generation section 37 generates a normal equation, which is an equation expressed by the determinant shown in a diagram of FIG. 7. In actuality, the normal-equation generation section 37 computes the value of a weight $t_k$, which is used as an element in the matrixes of the determinant shown in the diagram of FIG. 7, by making use of a distance vector d received from the distance-vector computation section 35. Then, the normal-equation generation section 37 creates parameters of the normal equation, which is being generated, on the basis of the weight $t_k$, the distance vector d, a prediction tap $X_k$ received from the prediction-tap extraction section 36 as a tap representing the student data and a true value $y_k$ received from the learning-pair storage section 31 as the value of the teacher data. As described earlier, the prediction tap $X_k$ represents data extracted from the student data as the prediction tap for the kth data of interest.

To put it concretely, the normal-equation generation section 37 creates the parameters of the normal equation making use of the prediction trap $X_k$ as a parameter denoted by symbol $X_k$ ($X_k=(X_k0, X_k1, \ldots X_kn)$ used to represent an n-dimensional vector of data extracted from the student data, making use of the true value $y_k$ as a parameter denoted by symbol $y_k$ in the normal equation to represent the teacher data for the kth data of interest and making use of the distance vector d to represent the distance vector for the kth data of interest.

As described above, the normal equation is an equation expressed by the determinant shown in the diagram of FIG. 7. The equation shown in the diagram of FIG. 7 is obtained by deriving a differential equation of Eq. (6) and setting the value of an expression represented by the differential equation at 0. Thus, the equation shown in the diagram of FIG. 7 is an equation representing a condition minimizing the value of an evaluation function expressed by Eq. (6) or a condition giving an optimal origin coefficient $W_0$ and an optimal deviation coefficient Wd which provide an predicted value y closest to the true value $y_k$. By the way, the evaluation function expressed by Eq. (6) is constructed by solving a relation equation expressed by Eq. (5) which is an equation for generating data of interest y of output data having a quality higher than the quality of the input data by carrying out a second computation process of multiplying a plurality of data extracted from the input data as a prediction tap X by a second prediction coefficient W. As described earlier, the output data and the input data correspond to the teacher data and the student data respectively. The second prediction coefficient W is a coefficient generated by carrying out a first computation process on a nonlinear feature quantity found from a plurality of data extracted from the input data as a distance vector d and a first prediction coefficient which includes an origin coefficient $W_0$ and a deviation coefficient Wd. Thus, the normal equation generated by the normal-equation generation section 37 can be said to be an equation for finding an optimal origin coefficient $W_0$ and an optimal deviation coefficient Wd as described above. The normal-equation generation section 37 provides the coefficient generation section 38 with the parameters of the normal equation.

The coefficient generation section 38 makes use of the parameters of the normal equation for computing an origin coefficient $W_0$ and a deviation coefficient Wd. That is to say, the coefficient generation section 38 finds an origin coefficient $W_0$ and a deviation coefficient Wd by solving the normal equation by making use of the parameters received from the normal-equation generation section 37 as the parameters of the normal equation. The coefficient generation section 38 stores the origin coefficient $W_0$ and the deviation coefficient Wd in the coefficient storage section 39 which is the coefficient storage section 13 employed in the signal processing apparatus 10 shown in the block diagram of FIG. 5. Thus, the signal processing apparatus 10 can make use of the origin coefficient $W_0$ and the deviation coefficient Wd which have been learned by the learning apparatus 30 in advance from the student data and the teacher data as described above.

Figure 9:
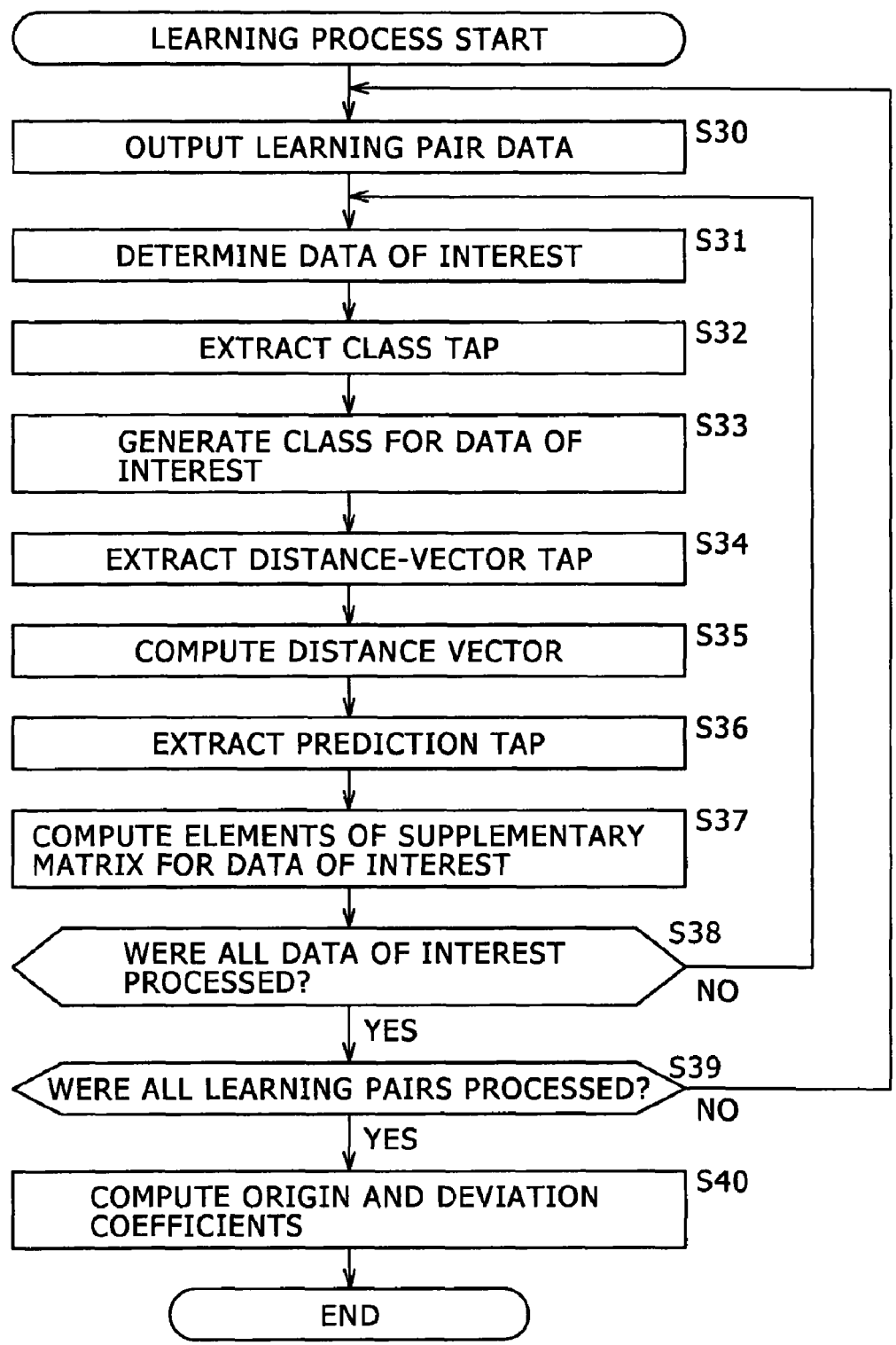
FIG. 9 shows a flowchart to be referred to in explanation of a learning process carried out by the learning apparatus shown in the block diagram of FIG. 8.

By referring to a flowchart shown in FIG. 9, the following description explains the learning process carried out by the learning apparatus 30 shown in the block diagram of FIG. 8.

The flowchart begins with a step S30 at which the learning-pair storage section 31 selects a piece of learning pair data among pieces of stored learning pair data as learning pair data not selected yet so far and outputs the selected piece of learning pair data. To put it concretely, the learning-pair storage section 31 outputs the student data of the selected piece of learning pair data to the class-tap extraction section 32, the distance-vector tap extraction section 34 and the prediction-tap extraction section 36 but outputs the teacher data of the selected piece of learning pair data to the normal-equation generation section 37.

Then, at the next step S31, in the same way as the class-tap extraction section 11 shown in FIG. 5, each of the class-tap extraction section 32, the distance-vector tap extraction section 34 and the prediction-tap extraction section 36 selects data not selected as data of interest yet from a plurality of data included in the teacher data and determines the selected data as data of interest.

Subsequently, at the next step S32, the class-tap extraction section 32 extracts a class tap corresponding to the data of interest from the student data and supplies the class tap to the class classification section 33.

Then, at the next step S33, in the same way as the class classification section 12 shown in FIG. 5, in accordance with the characteristic of the class tap provided from the class-tap extraction section 32, the class classification section 33 classifies the data of interest to a class and generates the class for the data of interest. Then, the class classification section 33 provides the normal-equation generation section 37 with the class.

Subsequently, at the next step S34, in the same way as the distance-vector tap extraction section 14 shown in FIG. 5, the distance-vector tap extraction section 34 extracts a distance-vector tap corresponding to the data of interest from the student data and supplies the distance-vector tap to the distance-vector computation section 35.

Then, at the next step S35, in the same way as the distance-vector computation section 15 shown in FIG. 5, the distance-vector computation section 35 computes a distance vector d from the distance-vector tap received from the distance-vector tap extraction section 34 and supplies the distance vector d to the normal-equation generation section 37.

Subsequently, at the next step S36, in the same way as the prediction-tap extraction section 17 shown in FIG. 5, the prediction-tap extraction section 36 extracts a prediction tap corresponding to the data of interest from the student data and supplies the prediction tap to the normal-equation generation section 37.

Then, at the next step S37, for the class received from the class classification section 33, the normal-equation generation section 37 generates a normal equation, which is an equation expressed by the determinant shown in a diagram of FIG. 7. In actuality, the normal-equation generation section 37 computes the value of a weight $t_k$ used as an element in the matrixes of the determinant shown in the diagram of FIG. 7 by making use of the distance vector d received from the distance-vector computation section 35. Then, the normal-equation generation section 37 creates parameters of the normal equation, which is being generated, on the basis of the weight $t_k$, the distance vector d, the prediction tap $X_k$ received from the prediction-tap extraction section 36 as a tap representing the student data and the true value $y_k$ received from the learning-pair storage section 31 as the value of the teacher data.

Then, at the next step S38, each of the class-tap extraction section 32, the distance-vector tap extraction section 34 and the prediction-tap extraction section 36 produces a result of determination as to whether or not each of data included in the teacher data pertaining to the current learning pair has been determined as data of interest. If the determination results produced at the step S38 indicate that any one of data included in the teacher data pertaining to the current learning pair has not been determined as data of interest, the flow of the learning process goes back to the step S31 to repeat the learning process described above.

If the determination results produced at the step S38 indicate that each of data included in the teacher data has been determined as data of interest, on the other hand, the flow of the signal processing goes on to a step S39 to produce a result of determination as to whether or not the processes of the steps S30 to S38 have been carried out on all pieces of learning pair data stored in the learning-pair storage section 31, that is, whether or not all pieces of learning pair data stored in the learning-pair storage section 31 have been processed. If the determination result produced at the step S39 indicates that the processes of the steps S30 to S38 have not been carried out on any piece of learning pair data stored in the learning-pair storage section 31, the flow of the learning process goes back to the step S30 to repeat the learning process described above.

If the determination result produced at the step S39 indicates that the processes of the steps S30 to S38 have been carried out on all pieces of learning pair data stored in the learning-pair storage section 31, on the other hand, the normal-equation generation section 37 provides the coefficient generation section 38 with the parameters created at the step S37.

Then, at the next step S40, the coefficient generation section 38 finds an origin coefficient $W_0$ and a deviation coefficient Wd by making use of the parameters received from the normal-equation generation section 37 to solve the equation, storing the origin coefficient $W_0$ and the deviation coefficient Wd in the coefficient storage section 39.

As described above, the learning apparatus 30 learns an origin coefficient $W_0$ and a deviation coefficient Wd for every data of interest pertaining to a class from learning pair data.

Thus, the signal processing apparatus 10 is capable of generating a prediction coefficient W by making use of a distance vector d as well as an origin coefficient $W_0$ and a deviation coefficient Wd which have been learned in advance for every data of interest. As a result, data of interest classified to be pertaining to the same class can be distinguished from each other on the basis of their prediction coefficients W. Therefore, the signal processing apparatus 10 is capable of generating output data having a quality further higher than the quality of the input data.

It is to be noted that the data processed by the signal processing apparatus 10 and the learning apparatus 30 can be any data. The following description explains a case in which image data is used as typical data processed by the signal processing apparatus 10 and the learning apparatus 30.

Figure 10:
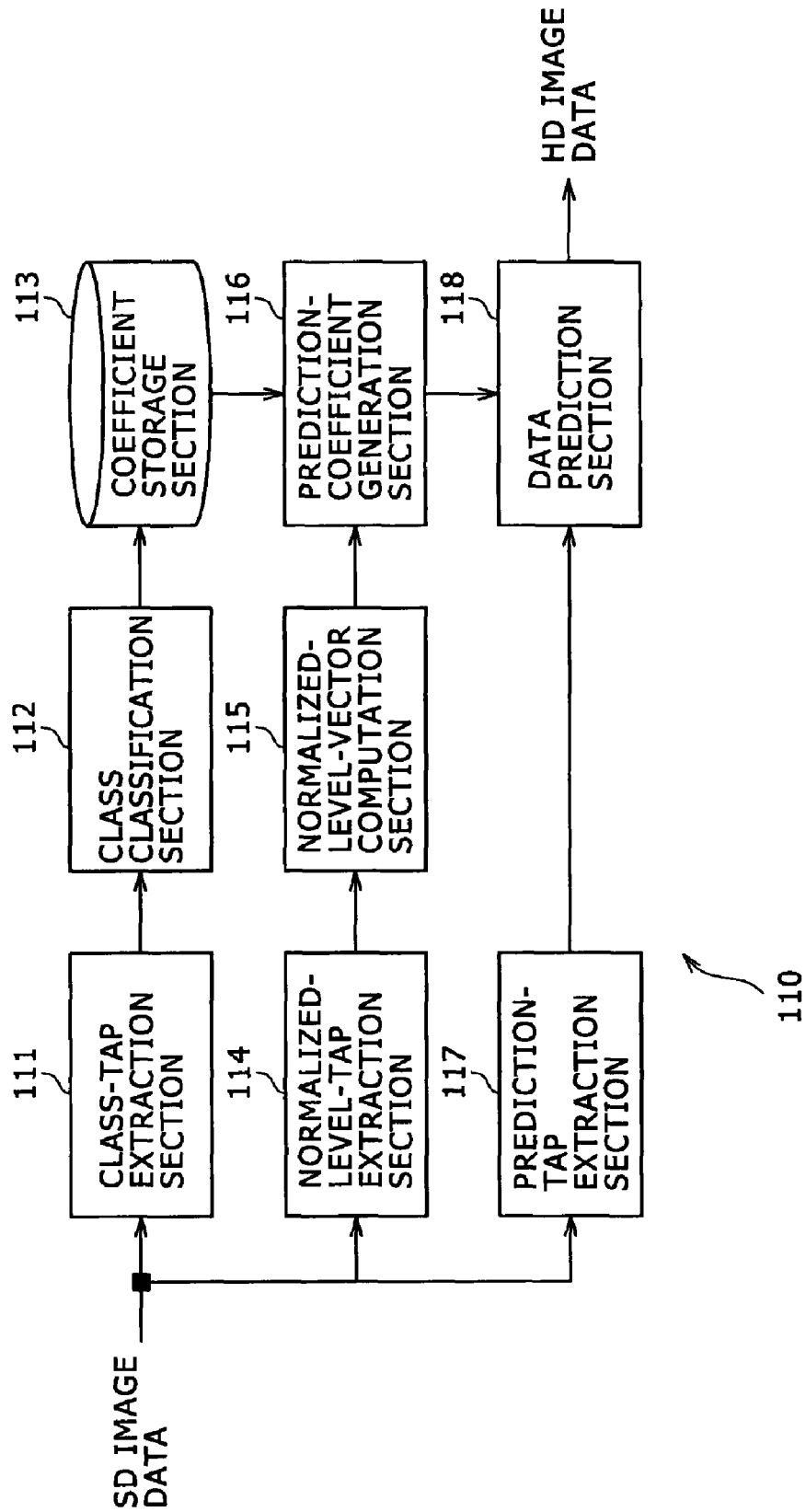
FIG. 10 is a block diagram showing a typical configuration of a signal processing apparatus according to a second embodiment of the present invention.

FIG. 10 is a block diagram showing a typical configuration of a signal processing apparatus 110 according to a second embodiment of the present invention.

As shown in the block diagram of FIG. 10, the signal processing apparatus 110 employs a class-tap extraction section 111, a class classification section 112, a coefficient storage section 113, a normalized-level-tap extraction section 114, a normalized-level-vector computation section 115, a prediction-coefficient generation section 116, a prediction-tap extraction section 117 and a data prediction section 118.

The signal processing apparatus 110 carries out a class adaptive process of converting input data, which is the SD (Standard Definition) image data of an SD image, into output data which is the HD (High Definition) image data of an HD image serving. To put it in detail, the signal processing apparatus 110 carries out the class adaptive process by determining a class for every pixel of interest included in an HD (High Definition) image generated from now on and computing an predicted pixel value of every pixel of interest included in the HD image in order to generate the HD image. The HD image data is composed of the pixel value of every pixel of interest included in the HD image. The predicted pixel value y of every pixel of interest is computed by making use of a prediction coefficient W and the SD (Standard Definition) image data X in accordance with Eq. (5). The prediction coefficient W is a coefficient computed by taking an origin coefficient $W_0$ of the class as a reference. The SD pixel data is composed of the pixel value of every pixel composing the SD image. Thus, in the class adaptive process, the SD image data is converted into the HD image having a resolution higher than the resolution of the SD image data.

To put it in detail, in the signal processing apparatus 110, the class-tap extraction section 111 sequentially determines each of a plurality of pixels composing the HD image represented by the HD image data, which is to be generated from now on from the SD image data representing the SD image, to serve as a pixel of interest. For each pixel of interest, the class-tap extraction section 111 extracts the values of a plurality of pixels composing the SD image from the SD image data as a class tap. To be used in a process carried out by the class classification section 112 to classify the pixel of interest to be a pixel of interest pertaining to a class, the pixel values extracted from the SD image data as a class tap are the values of pixels located at positions corresponding to the position of the pixel of interest in the HD image and peripheral positions surrounding the position of the pixel of interest. Then, the class-tap extraction section 111 supplies the class tap to the class classification section 112.

The class classification section 112 carries out a process of classifying a pixel of interest to a certain class in accordance with the characteristic of a class tap received from the class-tap extraction section 111. Then, the class classification section 112 generates the class for the pixel of interest. The class classification section 112 supplies the class to the coefficient storage section 113.

The coefficient storage section 113 is a memory used for storing an origin coefficient $W_0$ and a deviation coefficient Wd for every class. The origin coefficient $W_0$ and a deviation coefficient Wd have been learned in advance by a learning apparatus 130 shown in a block diagram of FIG. 12 described later. Receiving a class from the class classification section 112, the coefficient storage section 113 provides the prediction-coefficient generation section 116 with an origin coefficient $W_0$ and a deviation coefficient Wd which are associated with the class.

In the same way as the class-tap extraction section 111, the normalized-level-tap extraction section 114 sequentially determines each of a plurality of pixels composing the HD image represented by the HD image data to serve as a pixel of interest. For each pixel of interest, the normalized-level-tap extraction section 114 extracts the values of a plurality of pixels composing the SD image from the SD image data as a normalized-level tap. To be used in a process carried out by the normalized-level-vector computation section 115 to compute a normalized-level vector which is a vector of the normalized-level for the value of the pixel of interest, the pixel values extracted from the SD image data as a normalized-level tap are the values of pixels located at positions corresponding to the position of the pixel of interest in the HD image and peripheral positions surrounding the position of the pixel of interest. Then, the normalized-level-tap extraction section 114 supplies the normalized-level tap to the normalized-level-vector computation section 115.

The normalized-level-vector computation section 115 normalizes pixel values composing the normalized-level tap received from the normalized-level-tap extraction section 114. To put it concretely, for each of the pixel values L composing the normalized-level tap, first of all, the normalized-level-vector computation section 115 typically subtracts the minimum value $L_{min}$ of the pixel values L from each of the pixel values L to result in a difference of $(L-L_{min})$. Then, the normalized-level-vector computation section 115 divides the difference by $(L_{max}-L_{min})$, where notation $L_{max}$ denotes the maximum value of the pixel values L, in order to give a normalized pixel value $I_{level}$.

The normalized-level-vector computation section 115 supplies the normalized-level vector to the prediction-coefficient generation section 116. The normalized-level vector is a one-dimensional distance vector representing the normalized pixel values $I_{level}$ of the pixel values L extracted from the SD image data as the normalized-level tap.

The prediction-coefficient generation section 116 generates a prediction coefficient W by carrying out a computation process according to Eq. (2) based on the origin coefficient $W_0$ and the deviation coefficient Wd, which are received from the coefficient storage section 113, as well as the normalized-level vector received from the normalized-level-vector computation section 115. To put it concretely, in order to compute the prediction coefficient W, the prediction-coefficient generation section 116 sets m in Eq. (2) at 1 (that is, m=1). Then, the prediction-coefficient generation section 116 substitutes the origin coefficient $W_0$ and the deviation coefficient Wd into Eq. (2). The prediction-coefficient generation section 116 also substitutes the normalized-level vector into Eq. (2) as a substitute for the distance vector $d_0$. The prediction-coefficient generation section 116 supplies the prediction coefficient W to the data prediction section 118.

In the same way as the class-tap extraction section 111 and the normalized-level-tap extraction section 114, the prediction-tap extraction section 117 sequentially determines each of a plurality of pixels composing the HD image represented by the HD image data to serve as a pixel of interest. For each pixel of interest, the class-tap extraction section 117 extracts the values of a plurality of pixels composing the SD image from the SD image data as a prediction tap. To be used to predict the value of the pixel of interest, the pixel values extracted from the SD image data as a prediction tap are the values of pixels located at positions corresponding to the position of the pixel of interest in the HD image and peripheral positions surrounding the position of the pixel of interest. Then, the prediction-tap extraction section 117 supplies the class tap to the data prediction section 118.

The data prediction section 118 carries out a prediction process of predicting the value of a pixel of interest by making use of the prediction coefficient W received from the prediction-coefficient generation section 116 and the prediction tap X received from the prediction-tap extraction section 117 in accordance with Eq. (5), generating an predicted value y of the pixel of interest selected from the pixels of interest composing the HD image. Then, the data prediction section 118 outputs the HD image data composed of the predicted values of the pixels of interest each having an predicted value produced by the prediction process.

Figure 11:
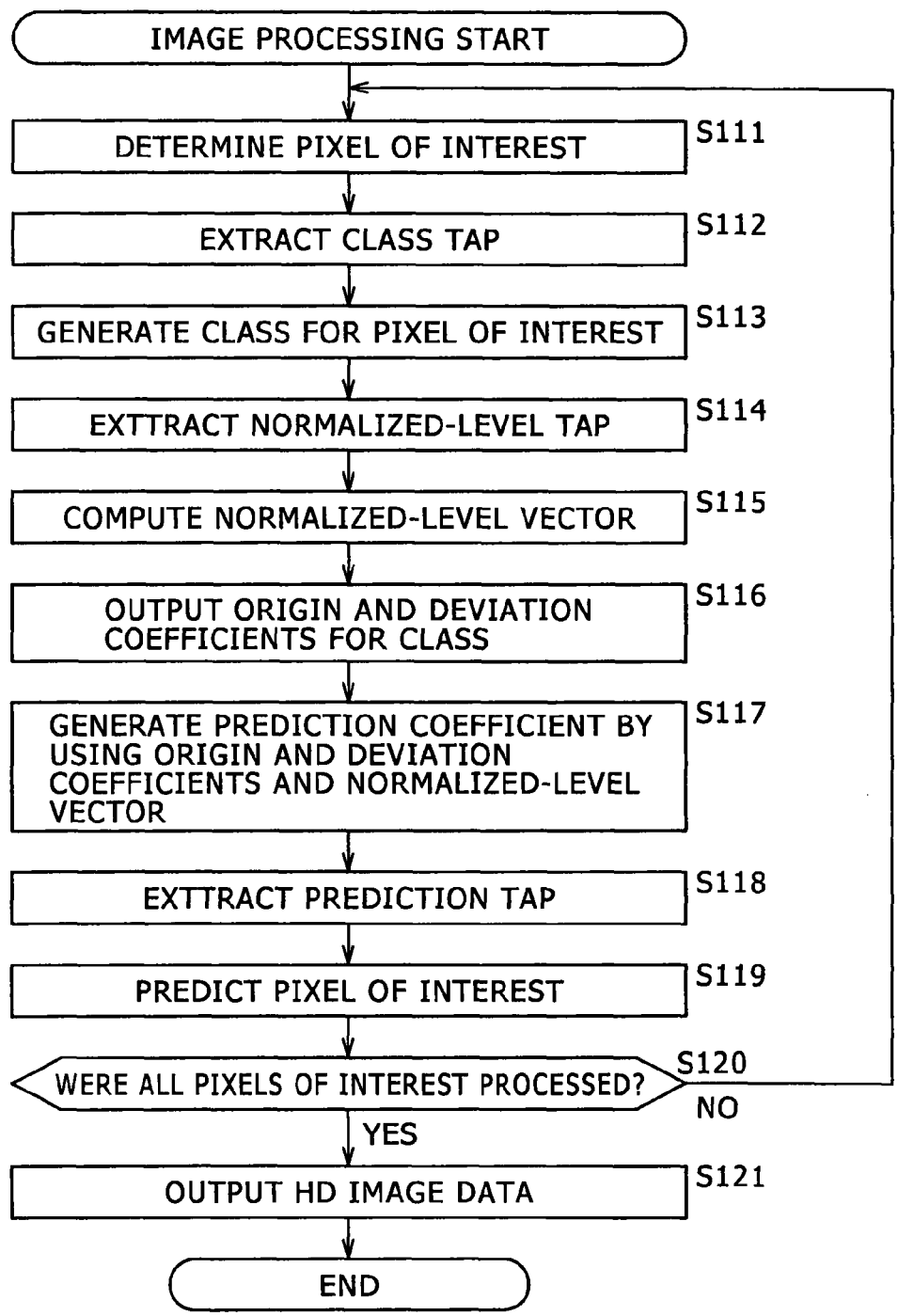
FIG. 11 shows a flowchart to be referred to in explanation of signal processing carried out by the signal processing apparatus shown in the block diagram of FIG. 10.

By referring to a flowchart shown in FIG. 11, the following description explains the image processing carried out by the signal processing apparatus 110 shown in the block diagram of FIG. 10.

The flowchart begins with a step S111 at which each of the class-tap extraction section 111, the normalized-level-tap extraction section 114 and the prediction-tap extraction section 117 selects a pixel, which has not been determined yet so far as a pixel of interest, from a plurality of pixels composing an HD image, and determines the selected one as a pixel of interest. Then, at the next step S112, the class-tap extraction section 111 extracts a class tap corresponding to the pixel of interest from SD image data and supplies the class tap to the class classification section 112.

Subsequently, at the next step S113, in accordance with the characteristic of the class tap received from the class-tap extraction section 111, the class classification section 112 classifies the pixel of interest to be a pixel of interest pertaining to a class and generates the class for the pixel of interest. Then, the class classification section 112 provides the coefficient storage section 113 with the class to which the pixel of interest pertains.

Subsequently, at the next step S114, the normalized-level-tap extraction section 114 extracts a normalized-level tap corresponding to the pixel of interest from the SD image data and supplies the normalized-level tap to the normalized-level-vector computation section 115.

Then, at the next step S115, the normalized-level-vector computation section 115 computes a normalized-level vector from the normalized-level tap received from the normalized-level-tap extraction section 114. To put it concretely, the normalized-level-vector computation section 115 normalizes pixel values composing the normalized-level tap and finds a one-dimensional vector representing the normalized pixel values as the normalized-level vector. Then, the normalized-level-vector computation section 115 supplies the normalized-level vector to the prediction-coefficient generation section 116.

Subsequently, at the next step S116, the coefficient storage section 113 outputs an origin coefficient $W_0$ and a deviation coefficient Wd, which correspond to the class received from the class classification section 112, to the prediction-coefficient generation section 116. Then, at the next step S117, the prediction-coefficient generation section 116 generates a prediction coefficient W by carrying out a computation process according to Eq. (2) based on the origin coefficient $W_O$ and the deviation coefficient Wd, which are received from the coefficient storage section 113, as well as the normalized-level vector received from the normalized-level-vector computation section 115. Subsequently, the prediction-coefficient generation section 116 supplies the prediction coefficient W to the data prediction section 118.

Then, at the next step S118, the prediction-tap extraction section 117 extracts a prediction tap corresponding to the pixel of interest from the SD image data and supplies the prediction tap to the data prediction section 118.

Subsequently, at the next step S119, in accordance with Eq. (5), the data prediction section 118 carries out a prediction process of predicting the value of a pixel of interest by making use of the prediction coefficient W received from the prediction-coefficient generation section 116 and the prediction tap X received from the prediction-tap extraction section 117, generating an predicted value y of the pixel of interest as the predicted value of one of the pixels of interest composing the HD image. Then, at the next step S120, each of the class-tap extraction section 111, the normalized-level-tap extraction section 114 and the prediction-tap extraction section 117 produces a result of determination as to whether or not each of pixels composing the HD image represented by the HD image data has been determined as a pixel of interest.

If the determination results produced at the step S120 indicate that any one of pixels composing the HD image has not been determined as a pixel of interest, the flow of the image processing goes back to the step S111 to repeat the image processing described above.

If the determination results produced at the step S120 indicate that each of pixels composing the HD image has been determined as a pixel of interest, on the other hand, the flow of the image processing goes on to a step S121 at which the data prediction section 118 outputs the HD image data composed of the predicted values each generated by carrying out the prediction process as an predicted value of the pixel of interest. Finally, the image processing is ended.

Figure 12:
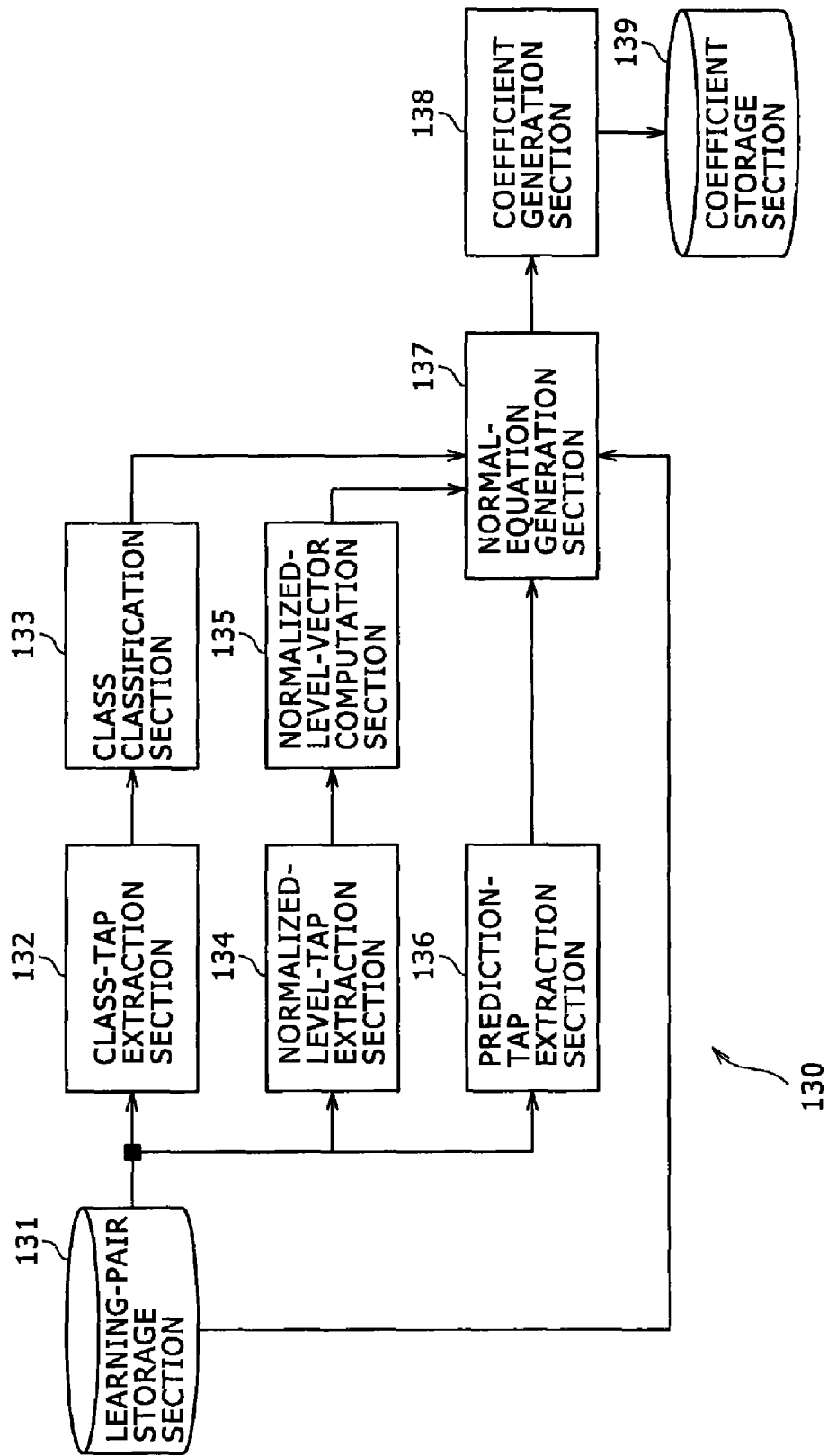
FIG. 12 is a block diagram showing a typical configuration of a learning apparatus for learning an origin coefficient and a deviation coefficient which are used by the signal processing apparatus shown in the diagram of FIG. 10 to compute a prediction coefficient.

FIG. 12 is a block diagram showing a typical configuration of a learning apparatus 130 for carrying out a learning process of learning an origin coefficient $W_O$ and a deviation coefficient Wd which are used by the signal processing apparatus 110 shown in the diagram of FIG. 10.

As shown in the block diagram of FIG. 12, the learning apparatus 130 employs a learning-pair storage section 131, a class-tap extraction section 132, a class classification section 133, a normalized-level-tap extraction section 134, a normalized-level-vector computation section 135, a prediction-tap extraction section 136, a normal-equation generation section 137, a coefficient generation section 138 and a coefficient storage section 139.

The learning-pair storage section 131 employed in the learning apparatus 130 is a memory used for storing learning pair data including student image data and teacher image data which form a learning pair. The student image data of the learning pair is one of data used in a process of learning an origin coefficient $W_O$ and a deviation coefficient Wd. The student image data of the learning pair corresponds to the SD image data used in the signal processing apparatus 110. The other data of the learning pair used in the process of learning is the teacher image data. The teacher image data of the learning pair is data corresponding to ideal teacher image data known for the student image data. The teacher image data corresponds to the HD image data used in the signal processing apparatus 110.

The learning-pair storage section 131 outputs the student image data of a learning pair to the class-tap extraction section 132, the normalized-level-tap extraction section 134 and the prediction-tap extraction section 136, but outputs the teacher image data to the normal-equation generation section 137. It is to be noted that, in the following description, an SD image represented by the student image data is also referred to as a student image whereas an HD image represented by the teacher image data is also referred to as a teacher image.

In the same way as the class-tap extraction section 111 shown in FIG. 10, the class-tap extraction section 132 sequentially determines each of a plurality of pixels composing a teacher image represented by teacher image data as a pixel of interest. For each pixel of interest, the class-tap extraction section 132 extracts the values of a plurality of pixels composing the student image from the student image data as a class tap. To be used to classify the pixel of interest to be a pixel of interest pertaining to a class, the values of the pixels extracted from the student image data as a class tap are the values of pixels located at positions corresponding to the position of the pixel of interest in the teacher image and peripheral positions surrounding the position of the pixel of interest. Then, the class-tap extraction section 132 supplies the class tap to the class classification section 133.

In the same way as the class classification section 112 shown in FIG. 10, the class classification section 133 carries out a process of classifying a pixel of interest to be a pixel of interest pertaining to a certain class in accordance with the characteristic of a class tap received from the class-tap extraction section 132 as a class tap. Then, the class classification section 133 generates the class for the pixel of interest. The class classification section 133 supplies the class to the normal-equation generation section 137.

In the same way as the normalized-level-tap extraction section 114 shown in FIG. 10 and the class-tap extraction section 132 described above, the normalized-level-tap extraction section 134 sequentially determines each of a plurality of pixels composing the teacher image represented by the teacher image data as a pixel of interest. For each pixel of interest, the normalized-level-tap extraction section 134 extracts the values of a plurality of pixels composing the student image from the student image data as a normalized-level tap. To be used in to compute a normalized-level vector corresponding to the pixel of interest, the values of the pixels extracted from the student image data as a normalized-level tap are the values of pixels located at positions corresponding to the position of the pixel of interest in the teacher image and peripheral positions surrounding the position of the pixel of interest. Then, the normalized-level-tap extraction section 134 supplies the normalized-level tap to the normalized-level-vector computation section 135.

In the same way as the normalized-level-vector computation section 115 shown in FIG. 10, the normalized-level-vector computation section 135 computes a normalized-level vector corresponding to the pixel of interest from the normalized-level tap received from the normalized-level-tap extraction section 134 by normalizing the pixel values composing the normalized-level tap. The normalized-level-vector computation section 135 supplies the normalized-level vector to the normal-equation generation section 137.

In the same way as the prediction-tap extraction section 117 shown in FIG. 10 as well as the class-tap extraction section 132 and the normalized-level-tap extraction section 134, which have been described above, the prediction-tap extraction section 136 sequentially determines each of a plurality of pixels composing the teacher image represented by the teacher image data as a pixel of interest. For each pixel of interest, the prediction-tap extraction section 136 extracts the values of a plurality of pixels composing the student image from the student image data as a prediction tap to be used for finding the normal equation for the pixel of interest. The values of the pixels extracted from the student image data as a prediction tap are the values of pixels located at positions corresponding to the position of the pixel of interest in the teacher image and peripheral positions surrounding the position of the pixel of interest. Then, the prediction-tap extraction section 136 supplies the prediction tap to the normal-equation generation section 137.

For every class received from the class classification section 133, the normal-equation generation section 137 generates a normal equation, which is an equation expressed by the determinant shown in the diagram of FIG. 7. In actuality, the normal-equation generation section 137 computes the value of a weight $t_k$ used as an element in the matrixes of the determinant shown in the diagram of FIG. 7 for m=1. Then, the normal-equation generation section 137 creates parameters of the normal equation, on the basis of the weight $t_k$, a normalized-level vector received from the normalized-level-vector computation section 135, a prediction tap $X_k$ received from the prediction-tap extraction section 136 as a tap representing the student image data and a true value $y_k$ received from the learning-pair storage section 131 as the value of the teacher image data. As described earlier, the prediction tap $X_k$ represents pixel values extracted from the student image data as the prediction tap for the kth pixel of interest.

To put it concretely, for every class received from the class classification section 133, the normal-equation generation section 137 creates the parameters of the normal equation by making use of the weight $t_k$ as a parameter denoted by symbol $t_k$ used in the normal equation to represent the weight for the kth sample (or the kth pixel of interest included in the teacher image), making use of the prediction trap $X_k$ as a parameter denoted by symbol $X_k(X_k=(X_k0, X_k1, \ldots X_kn)$ used in the normal equation to represent an n-dimensional vector of pixels extracted from the student image, making use of the true value $y_k$ as a parameter denoted by symbol $y_k$ in the normal equation to represent the teacher image data for the kth pixel of interest and making use of the normalized-level vector as a parameter denoted by symbol $d_0$ in the normal equation. Then, the normal-equation generation section 137 supplies the parameters of the normal equation to the coefficient generation section 138.

The coefficient generation section 138 finds an origin coefficient $W_0$ and a deviation coefficient Wd by making use of the parameters received from the normal-equation generation section 137 to solve the equation. The coefficient generation section 138 stores the origin coefficient $W_0$ and the deviation coefficient Wd in the coefficient storage section 139. Thus, the signal processing apparatus 110 can make use of the origin coefficient $W_0$ and the deviation coefficient Wd which have been learned by the learning apparatus 130 in advance from the student image data and the teacher image data as described above in advance.

Figure 13:
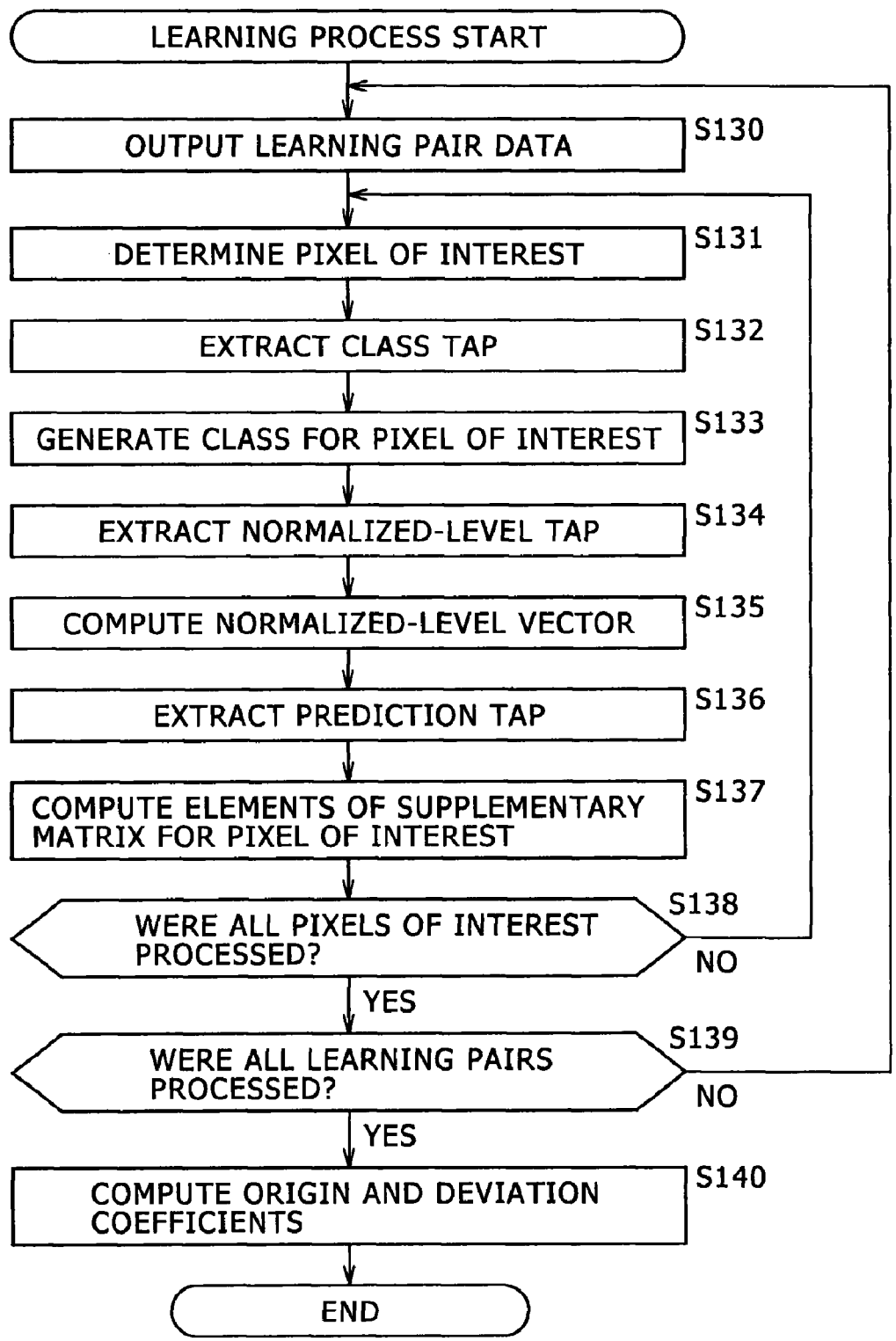
FIG. 13 shows a flowchart to be referred to in explanation of a learning process carried out by the learning apparatus shown in the block diagram of FIG. 12.

By referring to a flowchart shown in FIG. 13, the following description explains the learning process carried out by the learning apparatus 130 shown in the block diagram of FIG. 12.

The flowchart begins with a step S130 at which the learning-pair storage section 131 selects a piece of learning pair data among pieces of stored learning pair data as learning pair data not selected yet so far and outputs the student image data of the selected piece of learning pair data to the class-tap extraction section 132, the normalized-level-tap extraction section 134 and the prediction-tap extraction section 136 but outputs the teacher image data of the selected piece of learning pair data to the normal-equation generation section 137.

Then, at the next step S131, in the same way as the class-tap extraction section 111 shown in FIG. 10, each of the class-tap extraction section 132, the normalized-level-tap extraction section 134 and the prediction-tap extraction section 136 selects a pixel not selected as a pixel of interest yet from a plurality of pixels composing the teacher image and determines the selected pixel as a pixel of interest.

Subsequently, at the next step S132, the class-tap extraction section 132 extracts a class tap corresponding to the pixel of interest from the student image data and supplies the class tap to the class classification section 133.

Then, at the next step S133, in the same way as the class classification section 112 shown in FIG. 10, in accordance with the characteristic of the class tap received from the class-tap extraction section 132, the class classification section 133 classifies the pixel of interest to be a pixel of interest pertaining to a class and generates the class for the pixel of interest. Then, the class classification section 133 provides the normal-equation generation section 137 with the class.

Subsequently, at the next step S134, in the same way as the normalized-level-tap extraction section 114 shown in FIG. 10, the normalized-level-tap extraction section 134 extracts a normalized-level tap corresponding to the pixel of interest from the student image data and supplies the normalized-level tap to the normalized-level-vector computation section 135.

Then, at the next step S135, in the same way as the normalized-level-vector computation section 115 shown in FIG. 10, the normalized-level-vector computation section 135 computes a normalized-level vector from the normalized-level tap received from the normalized-level-tap extraction section 134 and supplies the normalized-level vector to the normal-equation generation section 137.

Subsequently, at the next step S136, in the same way as the prediction-tap extraction section 117 shown in FIG. 10, the prediction-tap extraction section 136 extracts a prediction tap corresponding to the pixel of interest from the student image data and supplies the prediction tap to the normal-equation generation section 137.

Then, at the next step S137, for the class received from the class classification section 133, the normal-equation generation section 137 generates a normal equation, which is an equation expressed by the determinant shown in the diagram of FIG. 7 for m=1, by making use of the normalized-level vector received from the normalized-level-vector computation section 135, the prediction tap received from the prediction-tap extraction section 136 and the teacher image data received from the learning-pair storage section 131.

Then, at the next step S138, each of the class-tap extraction section 132, the normalized-level-tap extraction section 134 and the prediction-tap extraction section 136 produces a result of determination as to whether or not each of pixels composing the teacher image represented by the teacher image data pertaining to the current learning pair has been determined as a pixel of interest. If the determination results produced at the step S138 indicate that any one of pixels composing the teacher image represented by the teacher image data pertaining to the current learning pair has not been determined as a pixel of interest, the flow of the learning process goes back to the step S131 to repeat the learning process described above.

If the determination results produced at the step S138 indicate that each of pixels composing the teacher image represented by the teacher image data pertaining to the current learning pair has been determined as a pixel of interest, on the other hand, the flow of the signal processing goes on to a step S139 to produce a result of determination as to whether or not the processes of the steps S130 to S138 have been carried out on all pieces of learning pair data stored in the learning-pair storage section 131, that is, whether or not all pieces of learning pair data stored in the learning-pair storage section 131 have been processed. If the determination result produced at the step S139 indicates that the processes of the steps S130 to S138 have not been carried out on any piece of learning pair data, the flow of the learning process goes back to the step S130 to repeat the learning process described above.

If the determination result produced at the step S139 indicates that the processes of the steps S130 to S138 have been carried out on all pieces of learning pair data, on the other hand, the normal-equation generation section 137 provides the coefficient generation section 138 with the parameters created at the step S137 as the parameters of the normal equation.

Then, at the next step S140, the coefficient generation section 138 finds an origin coefficient $W_0$ and a deviation coefficient Wd by making use of the parameters received from the normal-equation generation section 137 as the parameters of the normal equation to solve the equation, storing the origin coefficient $W_0$ and the deviation coefficient Wd in the coefficient storage section 139.

Figure 14:
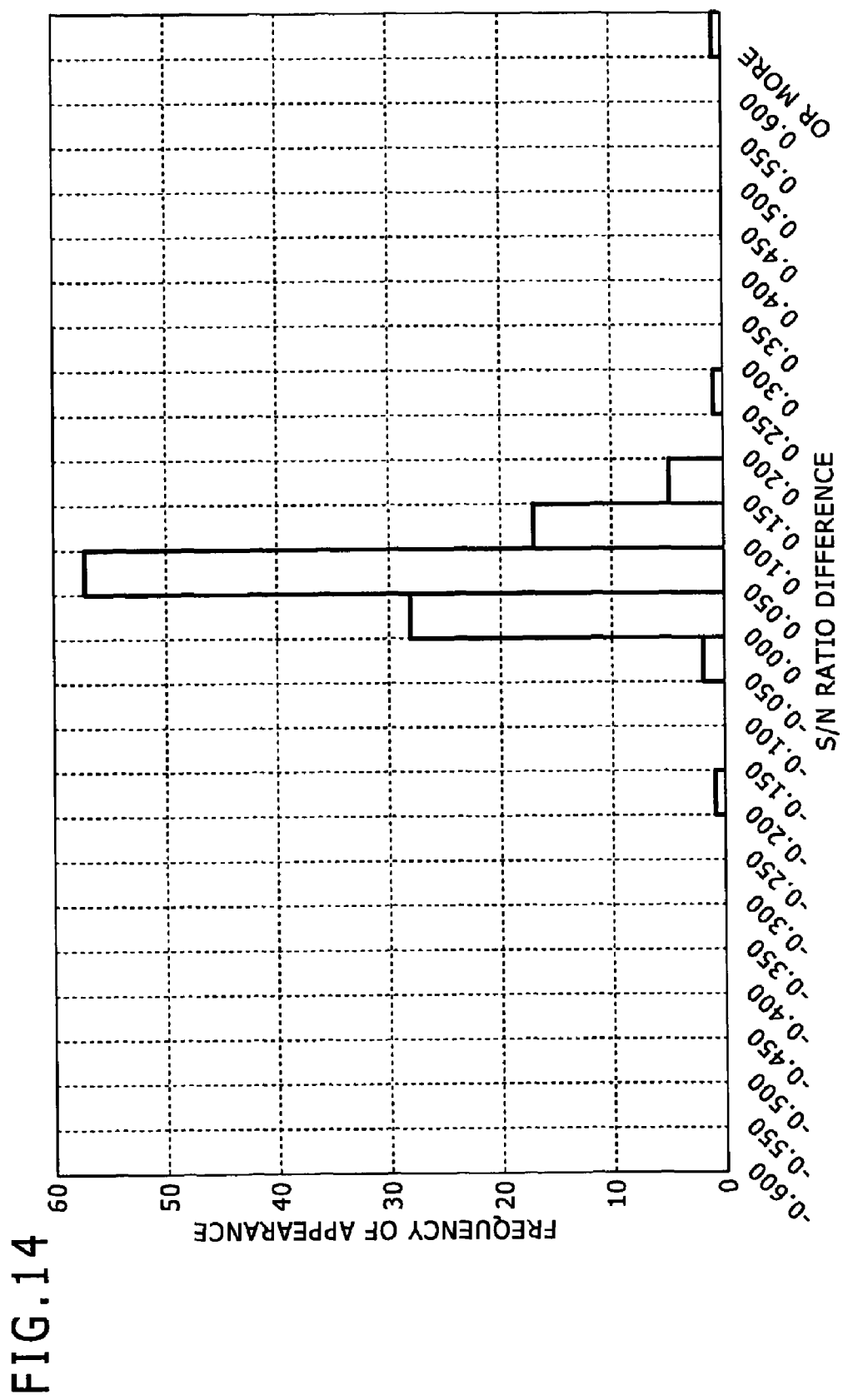
FIG. 14 is a histogram to be referred to in explanation of S/N (signal to noise) ratio differences obtained as a result of an experiment.

By referring to a histogram of FIG. 14, the following description explains an experiment result representing differences in S/N ratio between HD image data obtained as a result of a class adaptive process carried out by the signal processing apparatus 110 shown in the diagram of FIG. 10 and HD image data obtained as a result of an existing class adaptive process. In the following description, the HD image data generated by the signal processing apparatus 110 shown in the diagram of FIG. 10 is referred to as invention HD image data, the HD image data obtained as a result of the existing class adaptive process is referred to as existing HD image data and the difference in S/N ratio is referred to as an S/N ratio difference.

It is to be noted that, in the experiment resulting in the S/N ratio differences shown in the histogram of FIG. 14, data of 112 SD images was used as the subject of the experiment. In addition, in the class adaptive process carried out by the signal processing apparatus 110, a normalization distance between any specific pixel in a normalized-level tap and the center pixel of the normalized-level tap was used as the normalized level. The normalization distance is equal to a difference $|L_c-L|$ where notation $L_c$ denotes the value of the center pixel whereas notation L denotes the value of the specific pixel. On top of that, the 1-bit ADRC technique was adopted as a method of classifying a pixel of interest to be a pixel pertaining to a class whereas the maximum order p of the expansion was set at 1.

In the existing class adaptive process, on the other hand, the 2-bit ADRC technique was adopted as a method of classifying a pixel of interest to be a pixel pertaining to a class. In addition, in each of the class adaptive process carried out by the signal processing apparatus 110 and the existing class adaptive process, the number of pixels which have the values thereof used in each of the class tap and the prediction tap was nine.

Thus, in the experiment resulting in the S/N ratio differences shown in the histogram of FIG. 14, the total number of prediction coefficients W computed in the class adaptive process carried out by the signal processing apparatus 110 was 46,080 (=512×9×10). On the other hand, the total number of prediction coefficients W computed in the existing class adaptive process was 147,456 (=512×9×32) on the assumption that a class which does not exist theoretically does not include a pixel of interest.

The histogram of FIG. 14 shows the frequencies at which of the S/N ratio difference appears. The S/N ratio difference is a difference obtained by subtracting the S/N ratio of the invention HD image data generated in the experiment carried out under the conditions described above from the S/N ratio of the convention HD image data generated in the same experiment. It is to be noted that, in the histogram of FIG. 14, the horizontal axis represents the S/N ratio difference whereas the vertical axis represents the frequency at which the S/N ratio difference appears.

As described above, in the experiment resulting in the S/N ratio differences shown in the histogram of FIG. 14, the total number of prediction coefficients W computed in the class adaptive process carried out by the signal processing apparatus 110 was 46,080 which is small in comparison with the integer 147,456 representing the total number of prediction coefficients W computed in the existing class adaptive process. As shown in the histogram of FIG. 14, however, the results of the experiment indicate increases of the frequency at which the S/N ratio difference greater than 0 appears. That is to say, in most input image data, the S/N ratio of the invention HD image data is greater than the S/N ratio of the existing HD image data.

Thus, as is obvious from the results of the experiment, the signal processing apparatus 110 is capable of generating invention HD image data of an HD image having a high quality in comparison with an HD image represented by existing HD image data generated by carrying out the existing class adaptive process. In other words, the signal processing apparatus 110 computes a prediction coefficient W by making use of an optimal origin coefficient $W_0$ and an optimal deviation coefficient Wd, which have been learned in advance in a learning process, as well as a normalized-level vector. It is thus obvious that, in this way, the signal processing apparatus 110 is capable of generating a more optimal prediction coefficient W.

Figure 15:
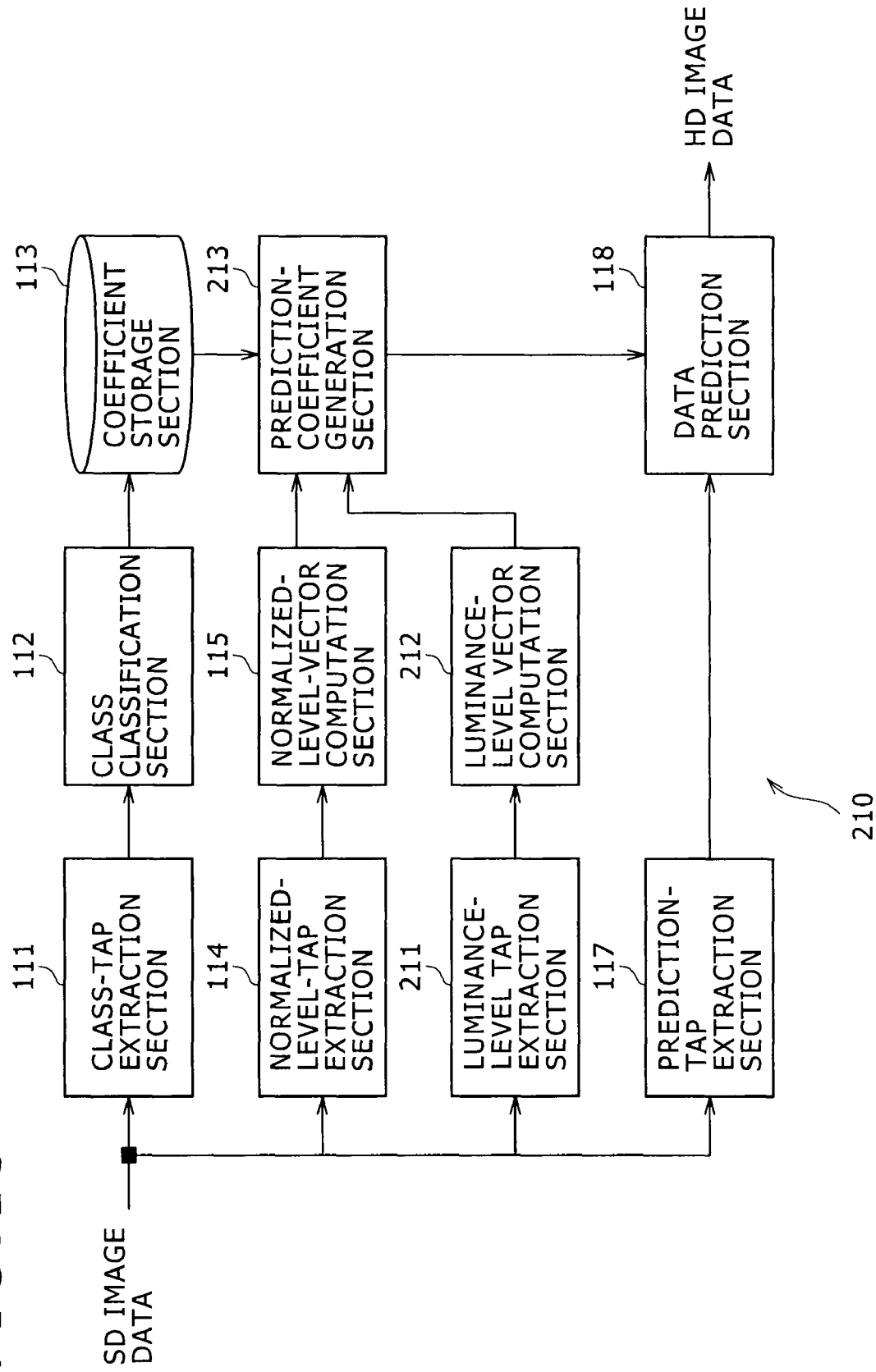
FIG. 15 is a block diagram showing a typical configuration of a signal processing apparatus according to a third embodiment of the present invention.

FIG. 15 is a block diagram showing a typical configuration of a signal processing apparatus 210 according to a third embodiment of the present invention.

In addition to the sections employed in the signal processing apparatus 110 according to the second embodiment shown in the block diagram of FIG. 10, the signal processing apparatus 210 shown in the block diagram of FIG. 15 also employs a luminance-level-tap extraction section 211 and a luminance-level-vector computation section 212. On top of that, the signal processing apparatus 210 also includes a prediction-coefficient generation section 213 serving as a substitute for the prediction-coefficient generation section 116 employed in the signal processing apparatus 110. In addition, as a distance vector d, the signal processing apparatus 210 makes use of a two-dimensional vector composed of a normalized-level vector and a luminance-level vector which is a vector representing the level of luminance.

In the same way as the class-tap extraction section 111, the luminance-level-tap extraction section 211 employed in the signal processing apparatus 210 sequentially determines each of a plurality of pixels composing the HD image represented by the HD image data to serve as a pixel of interest. For each pixel of interest, the luminance-level-tap extraction section 211 extracts the values of a plurality of pixels composing the SD image from the SD image data as a luminance-level tap. To be used to compute a luminance-level vector corresponding to the pixel of interest, the pixel values extracted from the SD image data as a luminance-level tap are the values of pixels located at positions corresponding to the position of the pixel of interest in the HD image and peripheral positions surrounding the position of the pixel of interest. Then, the luminance-level-tap extraction section 211 supplies the luminance-level tap to the luminance-level-vector computation section 212.

The luminance-level-vector computation section 212 computes a luminance-level vector representing luminance levels, which are each the value of one of pixels with their values composing the luminance-level tap received from the luminance-level-tap extraction section 211. The luminance-level-vector computation section 212 then supplies the luminance-level vector to the prediction-coefficient generation section 213.

The prediction-coefficient generation section 213 generates a prediction coefficient W by carrying out a computation process according to Eq. (2) based on the origin coefficient $W_0$ and the deviation coefficient Wd, which are received from the coefficient storage section 113, as well as the normalized-level vector received from the normalized-level-vector computation section 115 and the luminance-level vector received from the luminance-level-vector computation section 212. To put it concretely, in order to compute the prediction coefficient W, the prediction-coefficient generation section 213 sets m in Eq. (2) at 2 (that is, m=2). Then, the prediction-coefficient generation section 213 substitutes the origin coefficient $W_0$ and the deviation coefficient Wd into Eq. (2). The prediction-coefficient generation section 213 also substitutes the normalized-level vector into Eq. (2) as a substitute for the distance vector $d_0$ and substitutes the luminance-level vector into the same equation as a substitute for the distance vector $d_1$. The prediction-coefficient generation section 213 supplies the prediction coefficient W to the data prediction section 118.

Figure 16:
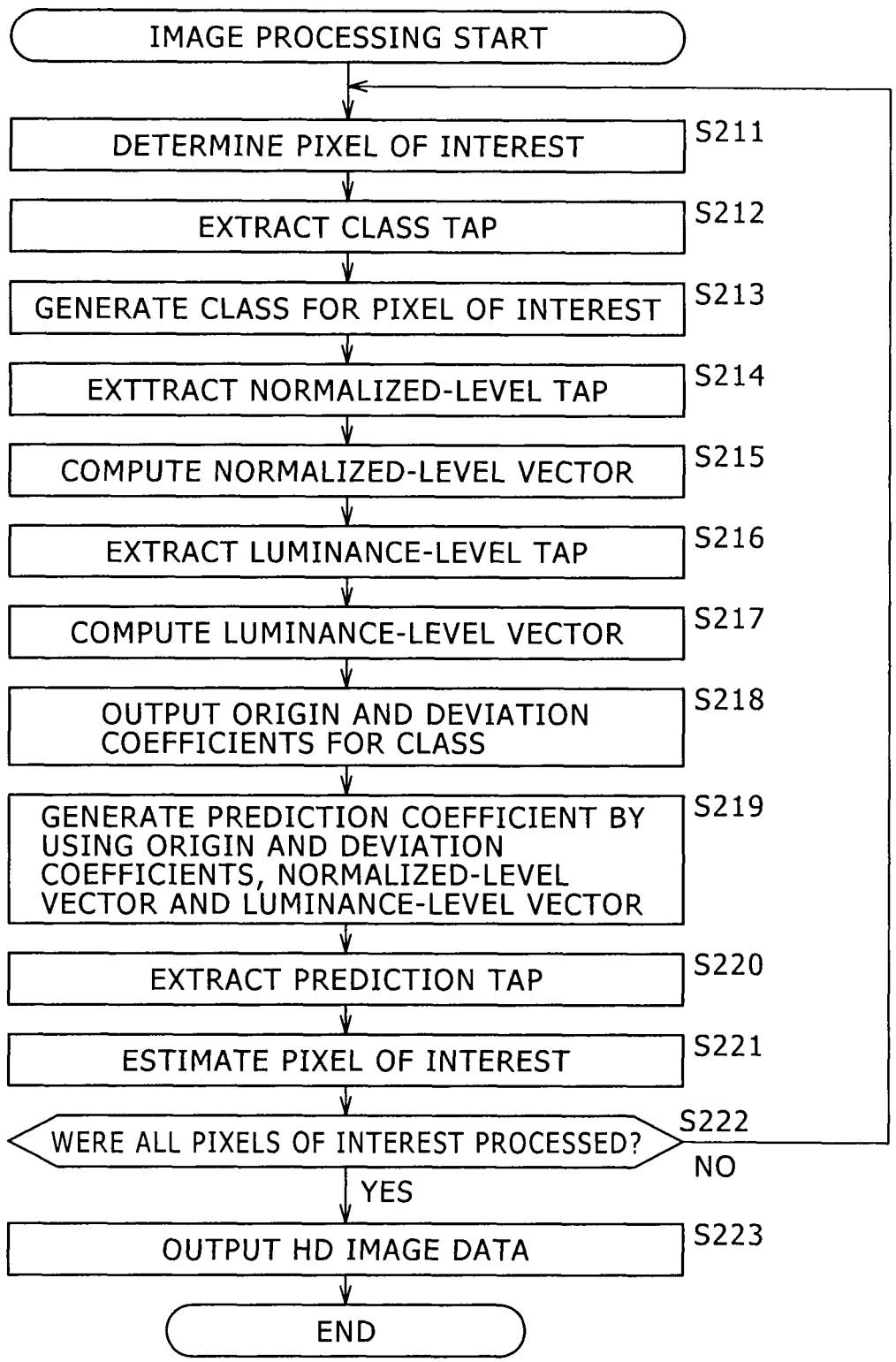
FIG. 16 shows a flowchart to be referred to in explanation of signal processing carried out by the signal processing apparatus shown in the block diagram of FIG. 15.

By referring to a flowchart shown in FIG. 16, the following description explains the image processing carried out by the signal processing apparatus 210 shown in the block diagram of FIG. 15.

Since steps S211 to S215 of the flowchart shown in FIG. 16 are identical with respectively the steps S111 to S115 of the flowchart shown in FIG. 11, the steps S211 to S215 are not explained in order to avoid duplications of descriptions. However, the process of the step S211 is carried out by not only the class-tap extraction section 111, the normalized-level-tap extraction section 114 and the prediction-tap extraction section 117, but also the luminance-level-tap extraction section 211 which also determines a pixel of interest as well.

At the next step S216 of the flowchart shown in FIG. 16, the luminance-level-tap extraction section 211 extracts a luminance-level tap corresponding to the pixel of interest from the SD image data and supplies the luminance-level tap to the luminance-level-vector computation section 212.

Then, at the next step S217, the luminance-level-vector computation section 212 computes a luminance-level vector from the luminance-level tap received from the luminance-level-tap extraction section 211. Subsequently, the luminance-level-vector computation section 212 supplies the normalized-level vector to the prediction-coefficient generation section 213.

Then, at the next step S218, the coefficient storage section 113 outputs an origin coefficient $W_0$ and a deviation coefficient Wd, which correspond to the class received from the class classification section 112, to the prediction-coefficient generation section 213 in the same way as the process carried out at the step S116 of the flowchart shown in FIG. 11.

Subsequently, at the next step S219, the prediction-coefficient generation section 213 generates a prediction coefficient W by carrying out a computation process according to Eq. (2) based on the origin coefficient $W_0$ and the deviation coefficient Wd, which are received from the coefficient storage section 113, as well as the normalized-level vector received from the normalized-level-vector computation section 115 and the luminance-level vector received from the luminance-level-vector computation section 212. Subsequently, the prediction-coefficient generation section 213 supplies the prediction coefficient W to the data prediction section 118.

Since steps S220 to S223 of the flowchart shown in FIG. 16 are identical with respectively the steps S118 to S121 of the flowchart shown in FIG. 11, the steps S220 to S223 are not explained in order to avoid duplications of descriptions. However, the process of the step S222 is carried out by not only the class-tap extraction section 111, the normalized-level-tap extraction section 114 and the prediction-tap extraction section 117, but also the luminance-level-tap extraction section 211 which also produces a result of the same determination as the class-tap extraction section 111, the normalized-level-tap extraction section 114 and the prediction-tap extraction section 117.

Figure 17:
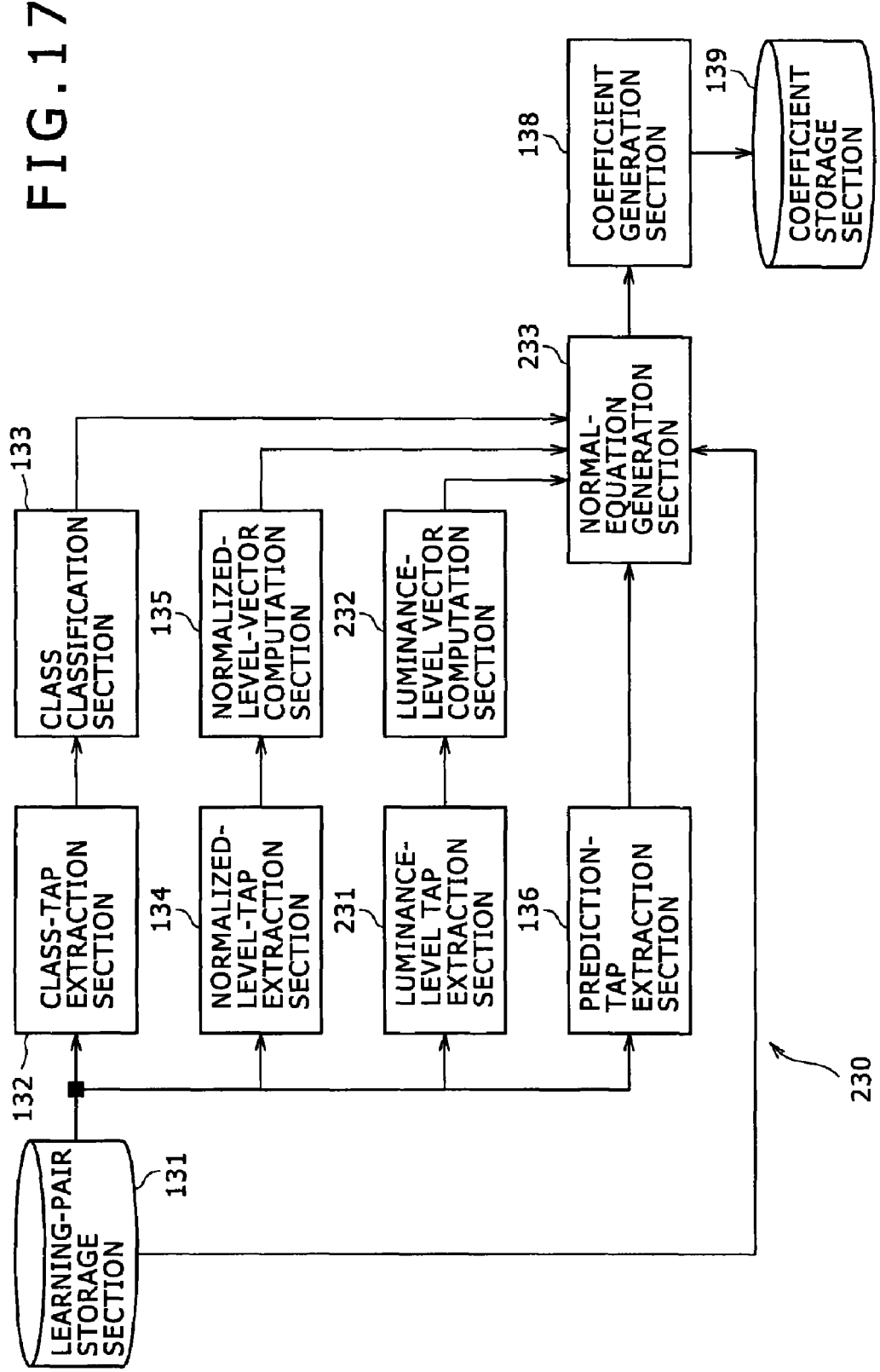
FIG. 17 is a block diagram showing a typical configuration of a learning apparatus for learning an origin coefficient and a deviation coefficient which are used by the signal processing apparatus shown in the diagram of FIG. 15 to compute a prediction coefficient.

FIG. 17 is a block diagram showing a typical configuration of a learning apparatus 230 for learning an origin coefficient $W_0$ and a deviation coefficient Wd which are used by the signal processing apparatus 210 shown in the diagram of FIG. 15 to compute a prediction coefficient W.

In addition to the sections employed in the learning apparatus 130 shown in the block diagram of FIG. 12, the learning apparatus 230 shown in the block diagram of FIG. 17 also employs a luminance-level-tap extraction section 231 and a luminance-level-vector computation section 232. On top of that, the learning apparatus 230 also includes a normal-equation generation section 233 serving as a substitute for the normal-equation generation section 137.

In the same way as the class-tap extraction section 132, the luminance-level-tap extraction section 231 employed in the learning apparatus 230 sequentially determines each of a plurality of pixels composing the teacher image as a pixel of interest. For each pixel of interest, the luminance-level-tap extraction section 231 extracts the values of a plurality of pixels composing the student image from the student image data as a luminance-level tap in the same way as the luminance-level-tap extraction section 211 shown in FIG. 15. To be used to compute a luminance-level vector corresponding to the pixel of interest, the values of the pixels extracted from the student image data as a luminance-level tap are the values of pixels located at positions corresponding to the position of the pixel of interest in the teacher image and peripheral positions surrounding the position of the pixel of interest. Then, the luminance-level-tap extraction section 231 supplies the luminance-level tap to the luminance-level-vector computation section 232.

In the same way as the luminance-level-vector computation section 212 shown in FIG. 15, the luminance-level-vector computation section 232 computes a luminance-level vector representing luminance levels, which are each the value of one of pixels with their values composing the luminance-level tap received from the luminance-level-tap extraction section 231. The luminance-level-vector computation section 232 then supplies the luminance-level vector to the normal-equation generation section 233.

For every class received from the class classification section 133, the normal-equation generation section 233 generates a normal equation, which is an equation expressed by the determinant shown in the diagram of FIG. 7. In actuality, the normal-equation generation section 233 computes the value of a weight $t_k$ used as an element in the matrixes of the determinant shown in the diagram of FIG. 7 for m=2. Then, the normal-equation generation section 233 creates parameters of the normal equation, which is being generated, on the basis of the weight $t_k$, a normalized-level vector received from the normalized-level-vector computation section 135, a luminance-level vector received from the luminance-level-vector computation section 232, a prediction tap $X_k$ received from the prediction-tap extraction section 136 as a tap representing the student image data and a true value $y_k$ received from the learning-pair storage section 131 as the value of the teacher image data. As described earlier, the prediction tap $X_k$ represents pixel values extracted from the student image data as the prediction tap for the kth pixel of interest.

For every class received from the class classification section 133, the normal-equation generation section 233 creates the parameters of the normal equation by making use of the weight $t_k$ as a parameter denoted by symbol $t_k$ used in the normal equation to represent the weight for the kth sample (or the kth pixel of interest included in the teacher image), making use of the prediction trap $X_k$ as a parameter denoted by symbol $X_k$ ($X_k=(X_k0, X_k1, \ldots X_kn)$ used in the normal equation to represent an n-dimensional vector of pixels extracted from the student image, making use of the true value $y_k$ as a parameter denoted by symbol $y_k$ in the normal equation to represent the teacher image data for the kth pixel of interest, making use of the normalized-level vector as a parameter denoted by symbol $d_0$ in the normal equation and making use of the luminance-level vector as a parameter denoted by symbol $d_1$. Then, the normal-equation generation section 233 supplies the parameters of the normal equation to the coefficient generation section 138.

Figure 18:
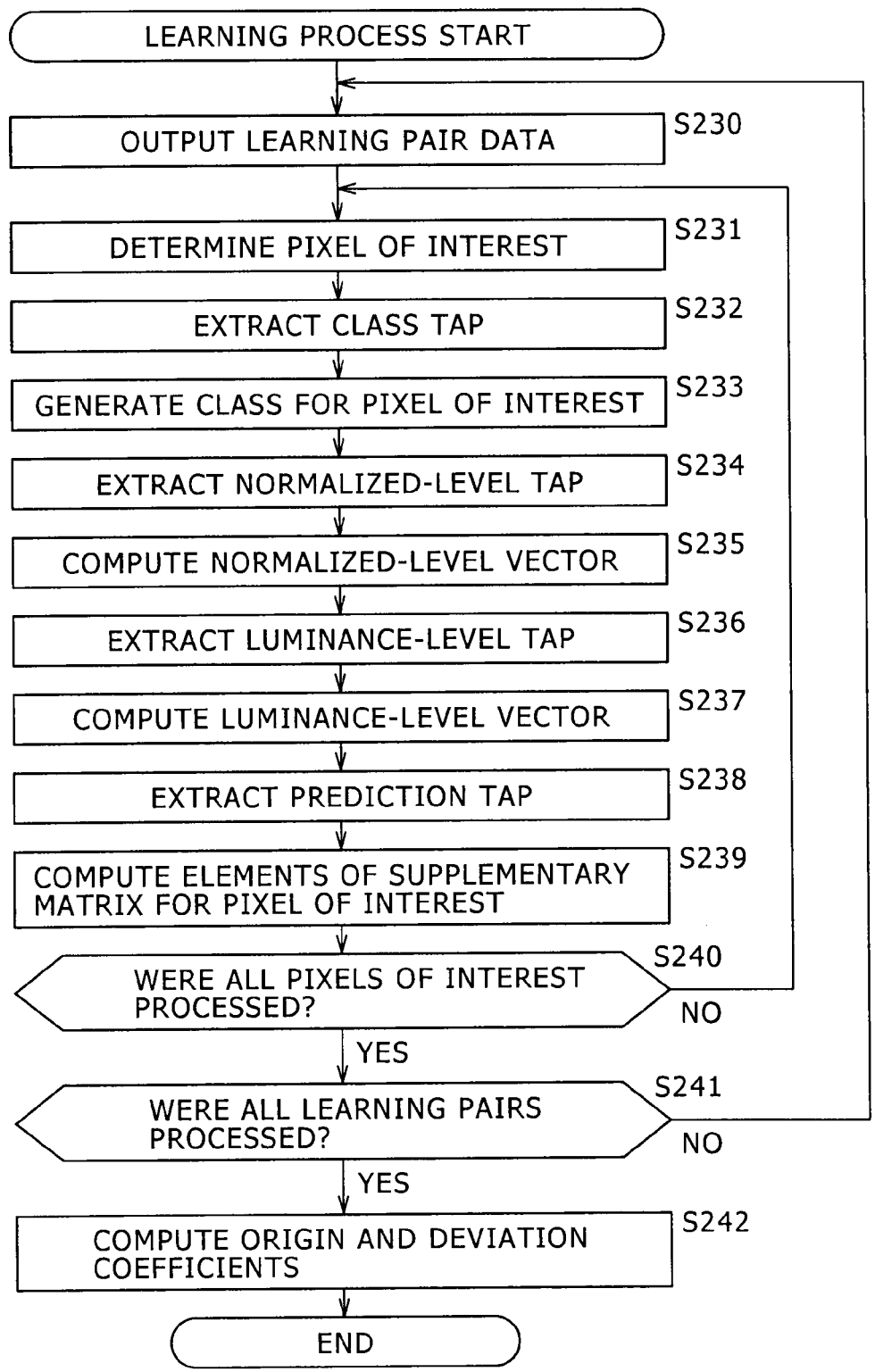
FIG. 18 shows a flowchart to be referred to in explanation of a learning process carried out by the learning apparatus shown in the block diagram of FIG. 17.

By referring to a flowchart shown in FIG. 18, the following description explains the learning process carried out by the learning apparatus 230 shown in the block diagram of FIG. 17.

Since steps S230 to S235 of the flowchart shown in FIG. 18 are identical with respectively the steps S130 to S135 of the flowchart shown in FIG. 13, the steps S230 to S235 are not explained in order to avoid duplications of descriptions. However, the process of the step S231 is carried out by not only the class-tap extraction section 132, the normalized-level-tap extraction section 134 and the prediction-tap extraction section 136, but also the luminance-level-tap extraction section 231 which also determines a pixel of interest as well.

At a step S236 of the flowchart shown in FIG. 18, for the pixel of interest, the luminance-level-tap extraction section 231 extracts the values of a plurality of pixels composing the student image from the student image data as a luminance-level tap in the same way as the luminance-level-tap extraction section 211 shown in FIG. 15. Then, the luminance-level-tap extraction section 231 supplies the normalized-level tap to the luminance-level-vector computation section 232.

Subsequently, at the next step S237, in the same way as the luminance-level-vector computation section 212 shown in FIG. 15, the luminance-level-vector computation section 232 computes a luminance-level vector representing luminance levels, which are each the value of one of pixels with their values composing the luminance-level tap received from the luminance-level-tap extraction section 231. The luminance-level-vector computation section 232 then supplies the luminance-level vector to the normal-equation generation section 233.

Subsequently, at the next step S238, in the same way as the step S136 of the flowchart shown in FIG. 13, the prediction-tap extraction section 136 extracts a prediction tap corresponding to the pixel of interest from the student image data and supplies the prediction tap to the normal-equation generation section 137.

Then, at the next step S239, for the class received from the class classification section 133, the normal-equation generation section 233 generates a normal equation, which is an equation expressed by the determinant shown in a diagram of FIG. 7 for m=2, by making use of a normalized-level vector received from the normalized-level-vector computation section 135, the luminance-level vector received from the luminance-level-vector computation section 232, the prediction tap received from the prediction-tap extraction section 136 and the teacher image data received from the learning-pair storage section 131.

Then, at the next step S240, each of the class-tap extraction section 132, the normalized-level-tap extraction section 134, the prediction-tap extraction section 136 and the luminance-level-tap extraction section 231 produces a result of determination as to whether or not each of pixels composing the teacher image represented by the teacher image data pertaining to the current learning pair has been determined as a pixel of interest. If the determination results produced at the step S240 indicate that any one of pixels composing the teacher image has not been determined as a pixel of interest, the flow of the learning process goes back to the step S231 to repeat the learning process described above.

If the determination results produced at the step S240 indicate that each of pixels composing the teacher image represented by the teacher image data pertaining to the current learning pair has been determined as a pixel of interest, on the other hand, the flow of the signal processing goes on to a step S241. Since the step S241 and a step S242 are identical with respectively the steps S139 and S140 of the flowchart shown in FIG. 13, the steps S241 and S242 are not explained in order to avoid duplications of descriptions.

It is to be noted that, as a distance vector d used in the signal processing apparatus 110 and/or the signal processing apparatus 210, vectors such as a vector representing the dynamic range of the SD image can also be used in addition to the normalized-level and luminance-level vectors.

In addition, in each of the signal processing apparatus 110 and the signal processing apparatus 210, the input data is SD image data whereas the output data is HD image data which is obtained as a result of image processing carried out by each of the signal processing apparatus 110 and the signal processing apparatus 210 to convert the input data. Thus, depending on how the input data and the output data are defined, the image processing can be carried out to implement a variety of processes.

That is to say, as an example, the input data is data representing an input image containing blurring spots, and data representing an output image no longer containing blurring spots is to be generated as output data. In this case, the image processing carried out to convert the input data into the output data is a blurring-spot removing process to eliminate the blurring spots from the input image. As another example, the input data is data representing an input image including noises, and data representing an output image no longer including noises is to be generated as output data. In this case, the image processing carried out to convert the input data into the output data is a noise removing process to eliminate the noises from the input image.

In the case of the blurring-spot removing process carried out by the signal processing apparatus 110 and/or the signal processing apparatus 220, it is possible to make use of vectors such as a vector representing ringing characteristic quantities and/or a vector representing blurring-amount inference values as the distance vector. It is to be noted that the ringing characteristic quantity is typically defined as the absolute value of a difference between the value of a specific pixel included in the input image as a pixel corresponding to a position separated away from a pixel of interest in the output image by a distance and the value of a pixel adjacent to the specific pixel. The vector representing ringing characteristic quantities thus represent such ringing characteristic quantities computed for distances which are the magnitudes of movements made by the input image represented by image data, which is used as input data, as an image containing blurring spots. Further, it is to be noted that the vector representing blurring-amount inference values is typically defined as the absolute value of a difference between the values of a plurality of pixels adjacent to each other included in an input image, existing at positions corresponding to the position of the pixel of interest and peripheral positions surrounding the position of the pixel of interest.

In addition, in the case of the noise removing process carried out by the signal processing apparatus 110 and/or the signal processing apparatus 210, it is possible to make use of typically a vector representing statistical-distribution inference values of noises as the distance vector. A statistical-distribution inference value is the value of a pixel. To put it concretely, the statistical-distribution inference value is the value of each of pixels included in an input image as pixels located at positions corresponding to the position of a pixel of interest in the output image and peripheral positions surrounding the position of the pixel of interest.

Each series of processes described previously can be carried out by hardware and/or execution of software. If the series of processes is carried out by execution of software, programs composing the software can be installed into a computer embedded in dedicated hardware, a general-purpose personal computer or the like from typically a recording medium. A general-purpose personal computer is a personal computer, which can be made capable of carrying out a variety of functions by installing a variety of programs into the personal computer.

Figure 19:
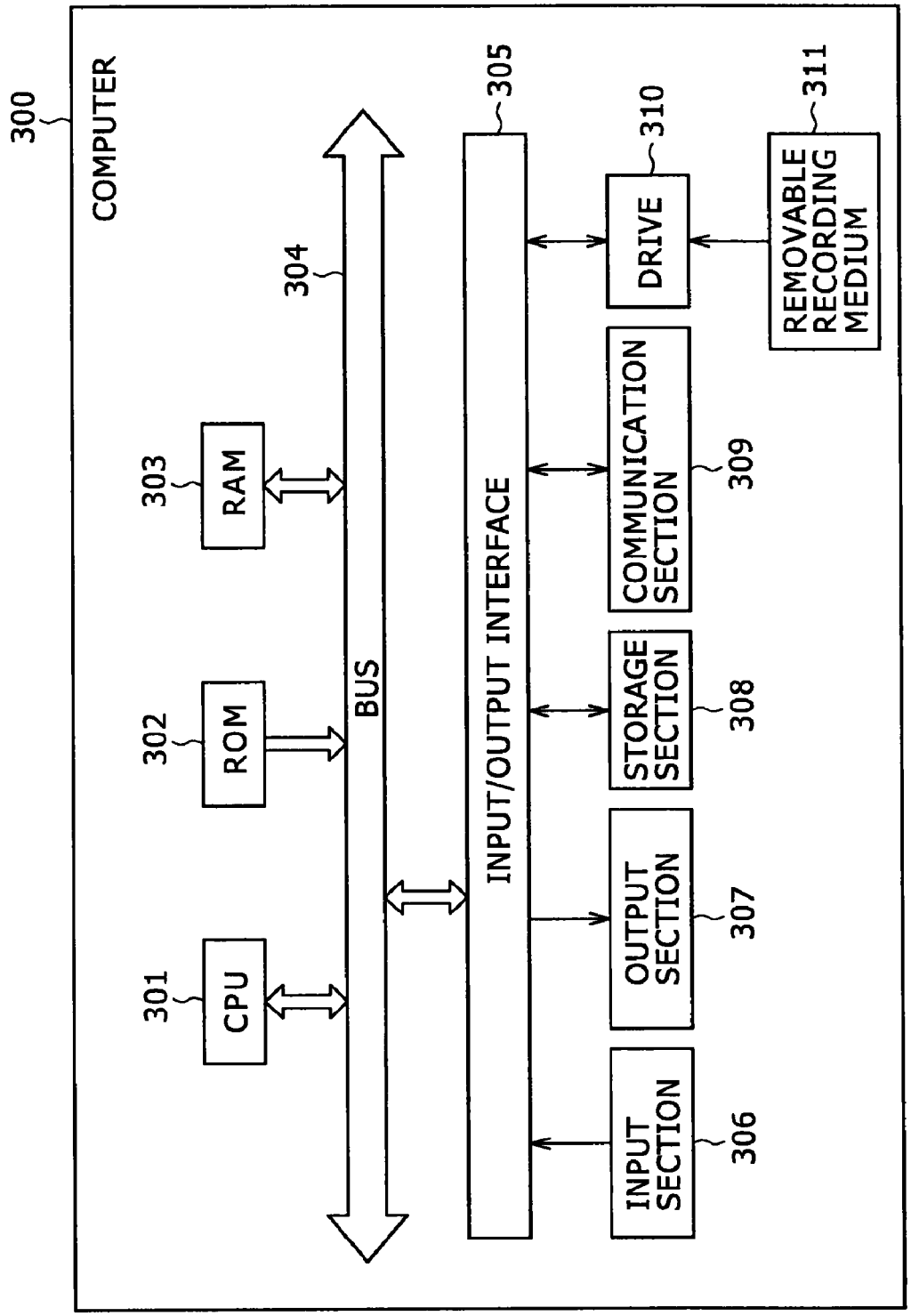
FIG. 19 is a block diagram showing a typical configuration of hardware composing a computer.

FIG. 19 is a block diagram showing a typical configuration of hardware composing the computer 300 for carrying out each series of processes described previously by execution of software.

The computer 300 employs a CPU (Central Processing Unit) 301, a ROM (Read Only Memory) 302 and a RAM (Random Access Memory) 303 which are connected to each other by a bus 304.

The bus 304 is also connected to an input/output interface 305 which is connected to an input section 306, an output section 307, a storage section 308, a communication section 309 and a drive 310. The input section 306 includes a keyboard, a mouse, a microphone and/or a data receiving unit for receiving a command from a remote controller. The output section 307 includes a display unit and a speaker whereas the storage section 308 includes a hard disk and/or a nonvolatile memory. The communication section 309 has a network interface. The drive 310 is a section on which a removable recording medium 311 is mounted. The removable recording medium 311 is a package medium which can be a magnetic disk such as a flexible disk, an optical disk such as a CD-ROM (Compact Disk-Read Only Memory) or a DVD (Digital Versatile Disk), a magneto-optical disk or a semiconductor memory.

In the computer 300 having the configuration described above, the CPU 301 carries out each series of processes described previously by execution of programs loaded from the storage section 308 into the RAM 303 by way of the input/output interface 305 and the bus 304.

The programs to be executed by the CPU 301 in the computer 300 are programs already installed in the storage section 308 from the removable recording medium 311 or programs installed in the storage section 308 by downloading the programs from an external program provider by way of a wire transmission medium such as a LAN (Local Area Network) or the Internet or a radio transmission medium such as digital satellite broadcasting.

The programs are installed in the storage section 308 from the removable recording medium 311 by transferring the programs from the removable recording medium 311 to the storage section 308 through the input/output interface 305. The programs downloaded from an external program provider by way of a wire or radio transmission medium are received by the communication section 309 and installed in the storage section 308 by way of the input/output interface 305. As described above, the programs can also be programs stored in advance in the ROM 302 or the storage section 308.

It is to be noted that a program to be executed by the computer 300 can be a program to be executed in an order conforming to a flowchart explained in this patent specification along the time axis, a program to be executed as parallel processing or a program to be executed by typically invocation with a proper timing.

It should be understood by those skilled in the art that various modifications, combinations, sub-combinations and alterations may occur depending on design requirements and other factor in so far as they are within the scope of the appended claims or the equivalents thereof.

What is claimed is:

1. A signal processing apparatus for carrying out signal processing to convert input data into output data with a quality higher than the quality of said input data, said data processing apparatus comprising:

first data extraction means for extracting a plurality of data included in said input data from said input data as data located at positions corresponding to the position of data of interest included in said output data and peripheral positions surrounding said position of said data of interest;

nonlinear feature quantity computation means for finding a nonlinear feature quantity for said data of interest from said data extracted by said first data extraction means;

processing coefficient generation means for generating a second processing coefficient by carrying out a computation process on said nonlinear feature quantity and a first processing coefficient already learned in advance from student data corresponding to said input data and teacher data corresponding to said output data in a learning process according to a normal equation based on a relation equation for generating said teacher data by carrying out a computation process on said student data and the second processing coefficient obtained in accordance with the nonlinear feature quantity of said student data and the first processing coefficient;

second data extraction means for extracting a plurality of data included in said input data from said input data as data located at position corresponding to said position of said data of interest and said peripheral positions surrounding said position of said data of interest; and data prediction means for predicting said data of interest by carrying out a computation process on said data extracted by said second data extraction means and said second processing coefficient.

2. The signal processing apparatus according to claim 1 wherein said first processing coefficient has an origin coefficient serving as a reference as well as a deviation coefficient which represents a deviation between said origin coefficient and said second processing coefficient in conjunction with said nonlinear feature quantity.

3. The signal processing apparatus according to claim 1, said signal processing apparatus further comprising class classification means for generating a class for said data of interest in accordance with the characteristic of a class tap representing data included in said input data as data located at positions corresponding to said position of said data of interest and peripheral positions surrounding said position of said data of interest, wherein said processing coefficient generation means generates said second processing coefficient by carrying out said first computation process on said nonlinear feature quantity and said first processing coefficient, which is selected from said first processing coefficients each learned in advance for any specific one of said classes in said learning process according to said normal equation provided for said specific class to serve as said first processing coefficient of said class generated by said class classification means.

4. A signal processing method for carrying out signal processing to convert input data into output data with a quality higher than the quality of said input data, said data processing method comprising the steps of:
first extracting a plurality of data included in said input data from said input data as data located at position corresponding to the position of data of interest included in said output data and peripheral positions surrounding said position of said data of interest;
finding a nonlinear feature quantity for said data of interest from said data extracted from said input data;
generating a second processing coefficient by carrying out a computation process on said nonlinear feature quantity and a first processing coefficient already learned in advance from student data corresponding to said input data and teacher data corresponding to said output data in a learning process according to a normal equation based on a relation equation for generating said teacher data by carrying out a computation process on said student data and the second processing coefficient obtained in accordance with the nonlinear feature quantity of said student data and the first processing coefficient;
second extracting a plurality of data included in said input data from said input data as data located at position corresponding to said position of said data of interest and said peripheral positions surrounding said position of said data of interest; and
predicting said data of interest by carrying out a computation process on said data extracted at said second extracting step and said second processing coefficient.

5. A non-transitory computer readable storage medium having encoded theron a program that when executed on a computer, implements a signal processing method for carrying out signal processing to convert input data into output data with a quality higher than the quality of said input data, said program serving as a program to be executed by a computer to carry out signal processing including the steps of:
first extracting a plurality of data included in said input data from said input data as data located at position corresponding to the position of data of interest included in said output data and peripheral positions surrounding said position of said data of interest;
finding a nonlinear feature quantity for said data of interest from said data extracted from said input data;
generating a second processing coefficient by carrying out a computation process on said nonlinear feature quantity and a first processing coefficient already learned in advance from student data corresponding to said input data and teacher data corresponding to said output data in a learning process according to a normal equation based on a relation equation for generating said teacher data by carrying out a computation process on said student data and the second processing coefficient obtained in accordance with the nonlinear feature quantity of said student data and the first processing coefficient;
second extracting a plurality of data included in said input data from said input data as data located at position corresponding to said position of said data of interest and said peripheral positions surrounding said position of said data of interest; and predicting said data of interest by carrying out a computation process on said data extracted at said second extracting step and said second processing coefficient.

6. A learning apparatus for carrying out a learning process of learning a first processing coefficient from student data and teacher data, said learning apparatus comprising:
normal-equation generation means for generating a normal equation, which is an equation constructed by solving a relation equation, by making use of input data as said student data and known output data as said teacher data for said input data; and
coefficient generation means for generating said first processing coefficient by solving said normal equation,
wherein said relation equation is an equation used in signal processing for generating output data having a quality higher than the quality of input data by carrying out a computation process on a plurality of data extracted from said input data and on a second processing coefficient which is obtained by carrying out a first computation process on a nonlinear feature quantity found in said signal processing from a plurality of data extracted from said input data and on said first processing coefficient generated in advance by said coefficient generation means.

7. The learning apparatus according to claim 6 wherein:
said first processing coefficient has an origin coefficient serving as a reference as well as a deviation coefficient which represents a deviation between said origin coefficient and said second processing coefficient in conjunction with said nonlinear feature quantity; and
said coefficient generation means generates said origin coefficient and said deviation coefficient by solving said normal equation.

8. The learning apparatus according to claim 6, said learning apparatus further comprising class classification means for generating a class for each data of interest included in said output data in accordance with the characteristic of a class tap representing data included in said input data as data located at position corresponding to said position of said data of interest and said peripheral positions surrounding said position of said data of interest, wherein said normal-equation generation means generates said normal equation by making use of said input data and said data of interest for each class generated by said class classification means.

9. A signal processing apparatus for carrying out signal processing to convert input data into output data with a quality higher than the quality of said input data, said data processing apparatus comprising:
a first data extraction section configured to extract a plurality of data included in said input data from said input data as data located at position corresponding to the position of data of interest included in said output data and peripheral positions surrounding said position of said data of interest;

a nonlinear feature quantity computation section configured to find a nonlinear feature quantity for said data of interest from said data extracted by said first data extraction section;

a prediction-coefficient generation section configured to generate a second processing coefficient by carrying out a computation process on said nonlinear feature quantity and a first processing coefficient already learned in advance from student data corresponding to said input data and teacher data corresponding to said output data in a learning process according to a normal equation based on a relation equation for generating said teacher data by carrying out a computation process on said student data and the second processing coefficient obtained in accordance with the nonlinear feature quantity of said student data and the first processing coefficient;

second data extraction section configured to extract a plurality of data included in said input data from said input data as data located at position corresponding to said position of said data of interest and said peripheral positions surrounding said position of said data of interest; and data prediction section configured to predict said data of interest by carrying out a computation process on said data extracted by said second data extraction section and said second processing coefficient.

10. A learning apparatus for carrying out a learning process of learning a first processing coefficient from student data and teacher data, said learning apparatus comprising:

a normal-equation generation section configured to generate a normal equation, which is an equation constructed by solving a relation equation, by making use of input data as said student data and known output data as said teacher data for said input data; and a coefficient generation section configured to generate said first processing coefficient by solving said normal equation, wherein said relation equation is an equation used in signal processing for generating output data having a quality higher than the quality of input data by carrying out a computation process on a plurality of data extracted from said input data and on a second processing coefficient which is obtained by carrying out a first computation process on a nonlinear feature quantity found in said signal processing from a plurality of data extracted from said input data and on said first processing coefficient generated in advance by said coefficient generation section.

* * * * *